United States Patent
Hodge

(10) Patent No.: US 10,277,640 B2
(45) Date of Patent: *Apr. 30, 2019

(54) SYSTEM AND METHOD FOR THIRD PARTY MONITORING OF VOICE AND VIDEO CALLS

(71) Applicant: **Global Tel*Link Corporation**, Reston, VA (US)

(72) Inventor: Stephen Lee Hodge, Plano, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,321

(22) Filed: Jan. 29, 2018

(65) Prior Publication Data

US 2018/0167421 A1 Jun. 14, 2018

Related U.S. Application Data

(63) Continuation of application No. 15/594,150, filed on May 12, 2017, now Pat. No. 9,923,936, which is a
(Continued)

(51) Int. Cl.
*G06K 9/00* (2006.01)
*H04M 3/22* (2006.01)
(Continued)

(52) U.S. Cl.
CPC ...... *H04L 65/1083* (2013.01); *H04M 3/2281* (2013.01); *H04N 7/141* (2013.01);
(Continued)

(58) Field of Classification Search
CPC .......... H04L 65/1083; H04M 3/2281
(Continued)

(56) References Cited

U.S. PATENT DOCUMENTS

| 4,054,756 A | 10/1977 | Comella et al. |
| 4,191,860 A | 3/1980 | Weber |

(Continued)

FOREIGN PATENT DOCUMENTS

| EP | 1280137 B1 | 12/2004 |
| EP | 2579676 A1 | 4/2013 |

(Continued)

OTHER PUBLICATIONS

"Cisco IAD2400 Series Business-Class Integrated Access Device", Cisco Systems Datasheet, 2003; 8 pages.
(Continued)

*Primary Examiner* — Quynh H Nguyen
(74) *Attorney, Agent, or Firm* — Sterne, Kessler, Goldstein & Fox P.L.L.C.

(57) ABSTRACT

A system is described herein that facilitates the monitoring of inmate communications. The system provides a remotely-accessible means for a reviewer to monitor a call between an inmate and another person. The system includes a monitoring server and a monitoring station. The monitoring server is configured to receive a call and call information from a communication center and process the call for monitoring, schedule a review of the call; and store the call, the call information, and scheduling data. The monitoring station is configured to receive the call and the call information from the monitoring server based on the scheduling data, and to display the identifying information and facilitate the review of the call.

29 Claims, 10 Drawing Sheets

Related U.S. Application Data continuation of application No. 15/331,414, filed on Oct. 21, 2016, now Pat. No. 9,674,340, which is a continuation of application No. 15/093,300, filed on Apr. 7, 2016, now Pat. No. 9,609,121.

(51) Int. Cl.
*H04M 3/42* (2006.01)
*H04N 7/14* (2006.01)
*H04N 7/15* (2006.01)
*H04L 29/06* (2006.01)

(52) U.S. Cl.
CPC ..... *G06K 9/00288* (2013.01); *G06K 9/00617* (2013.01); *H04M 3/42221* (2013.01); *H04M 2201/41* (2013.01); *H04M 2201/50* (2013.01); *H04M 2203/303* (2013.01); *H04M 2203/558* (2013.01); *H04M 2203/60* (2013.01); *H04M 2203/6054* (2013.01); *H04N 7/155* (2013.01)

(58) Field of Classification Search
USPC ............... 379/188, 200, 249; 370/259, 352
See application file for complete search history.

(56) References Cited

U.S. PATENT DOCUMENTS

| | | |
|---|---|---|
| 4,670,628 A | 6/1987 | Boratgis et al. |
| 4,691,347 A | 9/1987 | Stanley et al. |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,185,781 A | 2/1993 | Dowden et al. |
| 5,210,789 A | 5/1993 | Jeffus et al. |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,501 A | 9/1994 | Shelton |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,469,370 A | 11/1995 | Ostrover et al. |
| 5,485,507 A | 1/1996 | Brown et al. |
| 5,502,762 A | 3/1996 | Andrew et al. |
| 5,517,555 A | 5/1996 | Amadon et al. |
| 5,535,194 A | 7/1996 | Brown et al. |
| 5,535,261 A | 7/1996 | Brown et al. |
| 5,539,731 A | 7/1996 | Haneda et al. |
| 5,539,812 A | 7/1996 | Kitchin et al. |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,627,887 A | 5/1997 | Freedman |
| 5,634,086 A | 5/1997 | Rtischev et al. |
| 5,634,126 A | 5/1997 | Norell |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici |
| 5,768,426 A | 6/1998 | Rhoads |
| 5,774,452 A | 6/1998 | Greenberg |
| 5,793,415 A | 8/1998 | Gregory, III et al. |
| 5,796,811 A | 8/1998 | McFarlen |
| 5,805,685 A | 9/1998 | McFarlen |
| 5,809,462 A | 9/1998 | Nussbaum |
| 5,822,432 A | 10/1998 | Moskowitz |
| 5,822,436 A | 10/1998 | Rhoads |
| 5,832,068 A | 11/1998 | Smith |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,861,810 A | 1/1999 | Nguyen |
| 5,862,260 A | 1/1999 | Rhoads |
| 5,867,562 A | 2/1999 | Scherer |
| 5,883,945 A | 3/1999 | Richardson et al. |
| 5,889,868 A | 3/1999 | Seraphim et al. |
| 5,899,972 A | 5/1999 | Miyazawa et al. |
| 5,907,602 A | 5/1999 | Peel et al. |
| 5,915,001 A | 6/1999 | Uppaluru |
| 5,920,834 A | 7/1999 | Sih et al. |
| 5,923,746 A | 7/1999 | Baker et al. |
| 5,926,533 A | 7/1999 | Gainsboto |
| 5,930,369 A | 7/1999 | Cox et al. |
| 5,930,377 A | 7/1999 | Powell et al. |
| 5,937,035 A | 8/1999 | Andruska et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,991,373 A | 11/1999 | Pattison et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,038,315 A | 3/2000 | Strait et al. |
| 6,052,454 A | 4/2000 | Kek et al. |
| 6,052,462 A | 4/2000 | Lu |
| 6,058,163 A | 5/2000 | Pattison et al. |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,118,860 A | 9/2000 | Hillson et al. |
| 6,122,392 A | 9/2000 | Rhoads |
| 6,122,403 A | 9/2000 | Rhoads |
| 6,138,119 A | 10/2000 | Hall et al. |
| 6,141,406 A | 10/2000 | Johnson |
| 6,160,903 A | 12/2000 | Hamid et al. |
| 6,173,284 B1 | 1/2001 | Brown |
| 6,175,831 B1 | 1/2001 | Weinreich et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,211,783 B1 | 4/2001 | Wang |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,301,360 B1 | 10/2001 | Bocionek et al. |
| 6,308,171 B1 | 10/2001 | De La Huerga |
| 6,312,911 B1 | 11/2001 | Bancroft |

(56) References Cited

U.S. PATENT DOCUMENTS

| | | |
|---|---|---|
| 6,314,192 B1 | 11/2001 | Chen et al. |
| 6,324,573 B1 | 11/2001 | Rhoads |
| 6,324,650 B1 | 11/2001 | Ogilvie |
| 6,330,335 B1 | 12/2001 | Rhoads |
| 6,343,138 B1 | 1/2002 | Rhoads |
| 6,343,738 B1 | 2/2002 | Ogilvie |
| 6,345,252 B1 | 2/2002 | Beigi et al. |
| 6,381,321 B1 | 4/2002 | Brown et al. |
| 6,389,293 B1 | 5/2002 | Clore et al. |
| 6,421,645 B1 | 7/2002 | Beigi et al. |
| 6,526,380 B1 | 2/2003 | Thelen et al. |
| 6,542,602 B1 | 4/2003 | Elazar |
| 6,611,583 B1 | 8/2003 | Gainsboro |
| 6,625,261 B2 | 9/2003 | Holtzberg |
| 6,625,587 B1 | 9/2003 | Erten et al. |
| 6,633,846 B1 | 10/2003 | Bennett et al. |
| 6,636,591 B1 | 10/2003 | Swope et al. |
| 6,639,977 B1 | 10/2003 | Swope et al. |
| 6,639,978 B2 | 10/2003 | Draizin et al. |
| 6,647,096 B1 | 11/2003 | Milliorn et al. |
| 6,665,376 B1 | 12/2003 | Brown |
| 6,665,644 B1 | 12/2003 | Kanevsky et al. |
| 6,668,044 B1 | 12/2003 | Schwartz et al. |
| 6,668,045 B1 | 12/2003 | Mow |
| 6,671,292 B1 | 12/2003 | Haartsen |
| 6,688,518 B1 | 2/2004 | Valencia et al. |
| 6,728,345 B2 | 4/2004 | Glowny et al. |
| 6,728,682 B2 | 4/2004 | Fasciano |
| 6,748,356 B1 | 6/2004 | Beigi et al. |
| 6,760,697 B1 | 7/2004 | Neumeyer et al. |
| 6,763,099 B1 | 7/2004 | Blink |
| 6,782,370 B1 | 8/2004 | Stack |
| 6,788,772 B2 | 9/2004 | Barak et al. |
| 6,810,480 B1 | 10/2004 | Parker et al. |
| 6,850,609 B1 | 2/2005 | Schrage |
| 6,880,171 B1 | 4/2005 | Ahmad et al. |
| 6,895,086 B2 | 5/2005 | Martin |
| 6,898,612 B1 | 5/2005 | Parra et al. |
| 6,907,387 B1 | 6/2005 | Reardon |
| 6,920,209 B1 | 7/2005 | Gainsboro |
| 6,947,525 B2 | 9/2005 | Benco |
| 6,970,554 B1 | 11/2005 | Peterson et al. |
| 7,032,007 B2 | 4/2006 | Fellenstein et al. |
| 7,035,386 B1 | 4/2006 | Susen et al. |
| 7,039,171 B2 | 5/2006 | Gickler |
| 7,039,585 B2 | 5/2006 | Wilmot et al. |
| 7,046,779 B2 | 5/2006 | Hesse |
| 7,050,918 B2 | 5/2006 | Pupalaikis et al. |
| 7,062,286 B2 | 6/2006 | Grivas et al. |
| 7,075,919 B1 | 7/2006 | Wendt et al. |
| 7,079,636 B1 | 7/2006 | McNitt et al. |
| 7,079,637 B1 | 7/2006 | McNitt et al. |
| 7,092,494 B1 | 8/2006 | Anders et al. |
| 7,103,549 B2 | 9/2006 | Bennett et al. |
| 7,106,843 B1 | 9/2006 | Gainsboro et al. |
| 7,123,704 B2 | 10/2006 | Martin |
| 7,133,511 B2 | 11/2006 | Buntin et al. |
| 7,133,828 B2 | 11/2006 | Scarano et al. |
| 7,133,845 B1 | 11/2006 | Ginter et al. |
| 7,149,788 B1 | 12/2006 | Gundla et al. |
| 7,191,133 B1 | 3/2007 | Pettay |
| 7,197,560 B2 | 3/2007 | Caslin et al. |
| 7,236,932 B1 | 6/2007 | Grajski |
| 7,248,685 B2 | 7/2007 | Martin |
| 7,256,816 B2 | 8/2007 | Profanchik et al. |
| 7,277,468 B2 | 10/2007 | Tian et al. |
| 7,280,816 B2 | 10/2007 | Fratti et al. |
| 7,324,637 B2 | 1/2008 | Brown et al. |
| 7,333,798 B2 | 2/2008 | Hodge |
| 7,366,782 B2 | 4/2008 | Chong et al. |
| 7,406,039 B2 | 7/2008 | Cherian et al. |
| 7,417,983 B2 | 8/2008 | He et al. |
| 7,424,715 B1 | 9/2008 | Dutton |
| 7,466,816 B2 | 12/2008 | Blair |
| 7,494,061 B2 | 2/2009 | Reinhold |
| 7,496,345 B1 | 2/2009 | Rae et al. |
| 7,505,406 B1 | 3/2009 | Spadaro et al. |
| 7,519,169 B1 | 4/2009 | Hingoranee et al. |
| 7,529,357 B1 | 5/2009 | Rae et al. |
| 7,551,732 B2 | 6/2009 | Anders |
| 7,596,498 B2 | 9/2009 | Basu et al. |
| 7,639,791 B2 | 12/2009 | Hodge |
| 7,664,243 B2 | 2/2010 | Martin |
| 7,672,845 B2 | 3/2010 | Beranek et al. |
| RE41,190 E | 4/2010 | Darling |
| 7,698,182 B2 | 4/2010 | Falcone et al. |
| 7,742,581 B2 | 6/2010 | Hodge et al. |
| 7,742,582 B2 | 6/2010 | Harper |
| 7,783,021 B2 | 8/2010 | Hodge |
| 7,804,941 B2 | 9/2010 | Keiser et al. |
| 7,826,604 B2 | 11/2010 | Martin |
| 7,848,510 B2 | 12/2010 | Shaffer et al. |
| 7,853,243 B2 | 12/2010 | Hodge |
| 7,860,222 B1 | 12/2010 | Sidler et al. |
| 7,881,446 B1 | 2/2011 | Apple et al. |
| 7,899,167 B1 | 3/2011 | Rae |
| 7,961,860 B1 | 6/2011 | McFarlen |
| 8,031,052 B2 | 10/2011 | Polozola |
| 8,135,115 B1 | 3/2012 | Hogg, Jr. et al. |
| 8,204,177 B2 | 6/2012 | Harper |
| 8,295,446 B1 | 10/2012 | Apple et al. |
| 8,458,732 B2 | 6/2013 | Hanna et al. |
| 8,488,756 B2 | 7/2013 | Hodge et al. |
| 8,498,937 B1 | 7/2013 | Shipman, Jr. et al. |
| 8,509,390 B2 | 8/2013 | Harper |
| 8,577,003 B2 | 11/2013 | Rae |
| 8,630,726 B2 | 1/2014 | Hodge et al. |
| 8,731,934 B2 | 5/2014 | Olligschlaeger et al. |
| 8,886,663 B2 | 11/2014 | Gainsboro et al. |
| 8,917,848 B2 | 12/2014 | Torgersrud et al. |
| 8,929,525 B1 | 1/2015 | Edwards |
| 9,020,115 B2 | 4/2015 | Hangsleben |
| 9,043,813 B2 | 5/2015 | Hanna et al. |
| 9,077,680 B2 | 7/2015 | Harper |
| 9,094,500 B1 | 7/2015 | Edwards |
| 9,143,609 B2 | 9/2015 | Hodge |
| 9,232,051 B2 | 1/2016 | Torgersrud et al. |
| 9,307,386 B2 | 4/2016 | Hodge et al. |
| 9,396,320 B2 | 7/2016 | Lindemann |
| 9,552,417 B2 | 1/2017 | Olligschlaeger et al. |
| 9,609,121 B1 | 3/2017 | Hodge |
| 9,615,060 B1 | 4/2017 | Hodge |
| 9,621,504 B2 | 4/2017 | Torgersrud et al. |
| 9,674,340 B1 | 6/2017 | Hodge |
| 9,800,830 B2 | 10/2017 | Humphries |
| 9,923,936 B2 | 3/2018 | Hodge |
| 2001/0036821 A1 | 11/2001 | Gainsboro et al. |
| 2001/0043697 A1 | 11/2001 | Cox et al. |
| 2001/0056349 A1 | 12/2001 | St. John |
| 2001/0056461 A1 | 12/2001 | Kampe et al. |
| 2002/0002464 A1 | 1/2002 | Pertrushin |
| 2002/0010587 A1 | 1/2002 | Pertrushin |
| 2002/0032566 A1 | 3/2002 | Tzirkel-Hancock et al. |
| 2002/0046057 A1 | 4/2002 | Ross |
| 2002/0067272 A1 | 6/2002 | Lemelson et al. |
| 2002/0069084 A1 | 6/2002 | Donovan |
| 2002/0076014 A1 | 6/2002 | Holtzberg |
| 2002/0107871 A1 | 8/2002 | Wyzga et al. |
| 2002/0147707 A1 | 10/2002 | Kraay et al. |
| 2002/0174183 A1 | 11/2002 | Saeidi |
| 2003/0002639 A1 | 1/2003 | Huie |
| 2003/0023444 A1 | 1/2003 | St. John |
| 2003/0023874 A1 | 1/2003 | Prokupets et al. |
| 2003/0035514 A1 | 2/2003 | Jang |
| 2003/0040326 A1 | 2/2003 | Levy et al. |
| 2003/0070076 A1 | 4/2003 | Michael |
| 2003/0086546 A1 | 5/2003 | Falcone et al. |
| 2003/0093533 A1 | 5/2003 | Ezerzer et al. |
| 2003/0099337 A1 | 5/2003 | Lord |
| 2003/0126470 A1 | 7/2003 | Crites et al. |
| 2003/0174826 A1 | 9/2003 | Hesse |
| 2003/0190045 A1 | 10/2003 | Huberman et al. |
| 2004/0008828 A1 | 1/2004 | Coles et al. |
| 2004/0029564 A1 | 2/2004 | Hodge |

(56) References Cited

U.S. PATENT DOCUMENTS

| | | |
|---|---|---|
| 2004/0081296 A1 | 4/2004 | Brown et al. |
| 2004/0161086 A1 | 8/2004 | Buntin et al. |
| 2004/0169683 A1 | 9/2004 | Chiu et al. |
| 2004/0249650 A1 | 12/2004 | Freedman et al. |
| 2004/0252184 A1 | 12/2004 | Hesse et al. |
| 2004/0252447 A1 | 12/2004 | Hesse et al. |
| 2005/0010411 A1 | 1/2005 | Rigazio et al. |
| 2005/0027723 A1 | 2/2005 | Jones et al. |
| 2005/0080625 A1 | 4/2005 | Bennett et al. |
| 2005/0094794 A1 | 5/2005 | Creamer et al. |
| 2005/0102371 A1 | 5/2005 | Aksu |
| 2005/0114192 A1 | 5/2005 | Tor et al. |
| 2005/0125226 A1 | 6/2005 | Magee |
| 2005/0128283 A1 | 6/2005 | Bulriss et al. |
| 2005/0141678 A1 | 6/2005 | Anders et al. |
| 2005/0144004 A1 | 6/2005 | Bennett et al. |
| 2005/0170818 A1 | 8/2005 | Netanel et al. |
| 2005/0182628 A1 | 8/2005 | Choi |
| 2005/0207357 A1 | 9/2005 | Koga |
| 2006/0064037 A1 | 3/2006 | Shalon et al. |
| 2006/0087554 A1 | 4/2006 | Boyd et al. |
| 2006/0087555 A1 | 4/2006 | Boyd et al. |
| 2006/0093099 A1 | 5/2006 | Cho |
| 2006/0198504 A1 | 9/2006 | Shemisa et al. |
| 2006/0200353 A1 | 9/2006 | Bennett |
| 2006/0285650 A1 | 12/2006 | Hodge |
| 2006/0285665 A1 | 12/2006 | Wasserblat et al. |
| 2007/0003026 A1 | 1/2007 | Hodge et al. |
| 2007/0011008 A1 | 1/2007 | Scarano et al. |
| 2007/0041545 A1 | 2/2007 | Gainsboro |
| 2007/0047734 A1 | 3/2007 | Frost |
| 2007/0071206 A1 | 3/2007 | Gainsboro et al. |
| 2007/0133437 A1 | 6/2007 | Wengrovitz et al. |
| 2007/0185717 A1 | 8/2007 | Bennett |
| 2007/0192174 A1 | 8/2007 | Bischoff |
| 2007/0195703 A1 | 8/2007 | Boyajian et al. |
| 2007/0237099 A1 | 10/2007 | He et al. |
| 2007/0244690 A1 | 10/2007 | Peters |
| 2008/0000966 A1 | 1/2008 | Keiser |
| 2008/0021708 A1 | 1/2008 | Bennett et al. |
| 2008/0046241 A1 | 2/2008 | Osburn et al. |
| 2008/0096178 A1 | 4/2008 | Rogers et al. |
| 2008/0106370 A1 | 5/2008 | Perez et al. |
| 2008/0118045 A1 | 5/2008 | Polozola et al. |
| 2008/0195387 A1 | 8/2008 | Zigel et al. |
| 2008/0198978 A1 | 8/2008 | Olligschlaeger |
| 2008/0201143 A1 | 8/2008 | Olligschlaeger et al. |
| 2008/0201158 A1 | 8/2008 | Johnson et al. |
| 2008/0260133 A1 | 10/2008 | Hodge et al. |
| 2008/0300878 A1 | 12/2008 | Bennett |
| 2010/0177881 A1 | 7/2010 | Hodge |
| 2010/0202595 A1 | 8/2010 | Hodge et al. |
| 2010/0299761 A1 | 11/2010 | Shapiro |
| 2011/0055256 A1 | 3/2011 | Phillips et al. |
| 2011/0244440 A1 | 10/2011 | Saxon et al. |
| 2011/0279228 A1 | 11/2011 | Kumar et al. |
| 2012/0262271 A1 | 10/2012 | Torgersrud et al. |
| 2013/0104246 A1 | 4/2013 | Bear et al. |
| 2013/0124192 A1 | 5/2013 | Lindmark et al. |
| 2013/0179949 A1 | 7/2013 | Shapiro |
| 2014/0247926 A1 | 9/2014 | Gainsboro et al. |
| 2014/0273929 A1 | 9/2014 | Torgersrud |
| 2014/0287715 A1 | 9/2014 | Hodge et al. |
| 2014/0313275 A1 | 10/2014 | Gupta et al. |
| 2014/0334610 A1 | 11/2014 | Hangsleben |
| 2015/0206417 A1 | 7/2015 | Bush |
| 2015/0215254 A1 | 7/2015 | Bennett |
| 2015/0221151 A1 | 8/2015 | Bacco et al. |
| 2015/0281431 A1 | 10/2015 | Gainsboro et al. |
| 2015/0281433 A1 | 10/2015 | Gainsboro et al. |
| 2016/0191484 A1 | 6/2016 | Gongaware |
| 2016/0224538 A1 | 8/2016 | Chandrasekar et al. |
| 2016/0239932 A1 | 8/2016 | Sidler et al. |
| 2016/0301728 A1 | 10/2016 | Keiser et al. |
| 2016/0371756 A1 | 12/2016 | Yokel et al. |
| 2016/0373909 A1 | 12/2016 | Rasmussen et al. |
| 2017/0270627 A1 | 9/2017 | Hodge |
| 2017/0295212 A1 | 10/2017 | Hodge |

FOREIGN PATENT DOCUMENTS

| | | |
|---|---|---|
| GB | 2075313 | 11/1981 |
| JP | 59225626 | 12/1984 |
| JP | 60010821 | 1/1985 |
| JP | 61135239 | 6/1986 |
| JP | 3065826 | 3/1991 |
| WO | WO 96/14703 A1 | 11/1995 |
| WO | WO 98/13993 A1 | 4/1998 |
| WO | WO 2001/074042 A2 | 10/2001 |
| WO | WO 2016/028864 A1 | 2/2016 |

OTHER PUBLICATIONS

"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/inti_cf.html; 5 pages.

"Hong Kong: Prison Conditions in 1997," Human Rights Watch, Mar. 1, 1997, C905, available at http://www.refworld.org/docid/3ae6a7d014.html, accessed May 29, 2014; 48 pages.

"PacketCable™ 1.0 Architecture Framework Technical Report", PKT-TR-ARCH-V01-001201 (Cable Television Laboratories, Inc. 1999).

"PacketCable™ Audio/Video Codecs Specification," Cable Television Laboratories, Inc., Ser. No. PKT-SP-CODEC-I05-040113 (2004).

"Service-Observing Arrangements Using Key Equipment for Telephone Company Business Offices, Description and Use," Pac. Tel. & Tel. Co., Bell System Practices, Station Operations Manual, Section C71.090, Issue A, 1-1-57-N, 1957; 8 pages.

"SIP and IPLink™ in the Next Generation Network: An Overview;" Intel, 2001; 6 pages.

"The AutoEDMS Document Management and Workflow System: An Overview of Key Features, Functions and Capabilities," ACS Software, May 2003; 32 pages.

"Voice Over Packet in Next Generation Networks: An Architectural Framework," Bellcore, Special Report SR-4717, Issue 1, Jan. 1999; 288 pages.

"Cool Edit Pro, Version 1.2 User Guide," Syntrillium Software Corporation, 1998; 226 pages.

"Criminal Calls: A Review of the Bureau of Prisons' Management of Inmate Telephone Privileges," U.S. Department of Justice, Office of the Inspector General, Aug. 1999; 166 pages.

"Global Call API for Linux and Windows Operating Systems," Intel Dialogic Library Reference, Dec. 2005; 484 pages.

"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf; 9 pages.

Aggarwal, et al., "An Environment for Studying Switching System Software Architecture," IEEE, Global Telecommunications Conference, 1988; 7 pages.

Amendment and Response Under 37 C.F.R. §1.111 dated Sep. 30, 2011, in U.S. Appl. No. 11/706,431; 12 pages.

Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.

Audacity Team, "About Audacity," World Wide Web, 2014, accessible at http://wiki.audacity.team.org/wiki/About_Audacity; 3 pages.

Beek et al., "An Assessment of the Technology of Automatic Speech Recognition for Military Applications," IEEE Trans. Acoustics, Speech, and Signal Processing, vol. ASSP-25, No. 4, 1977; pp. 310-322.

Beigi, et al., "A Hierarchical Approach to Large-Scale Speaker Recognition," EuroSpeech 1999, Sep. 1999, vol. 5; pp. 2203-2206.

Beigi, et al., "IBM Model-Based and Frame-By-Frame Speaker-Recognition," Speaker Recognition and its Commercial and Forensic Applications, Apr. 1998; pp. 1-4.

(56) References Cited

OTHER PUBLICATIONS

Beigi, H., "Challenges of Large-Scale Speaker Recognition," 3rd European Cooperation in the Field of Scientific and Technical Research Conference, Nov. 4, 2005; 33 pages.
Beigi, H., "Decision Theory," Fundamentals of Speaker Recognition, Ch. 9, Springer, US 2011; pp. 313-339.
Bender, et al., "Techniques for Data Hiding," IBM Systems Journal, vol. 35, Nos. 3&4, 1996; 24 pages.
Boersma, et al., "Praat: Doing Phonetics by computer," World Wide Web, 2015, accessible at http://www.fon.hum.uva.nl/praat; 2 pages.
Bolton, et al., "Statistical Fraud Detection: A Review," Statistical Science, vol. 17, No. 3 (2002), pp. 235-255.
Boney, L., et al., "Digital Watermarks for Audio Signals" Proceedings of EUSIPC0-96, Eighth European Signal processing Conference, Trieste, Italy, 10-13 (1996).
Boney, L., et al., "Digital Watermarks for Audio Signals" Proceedings of the International Conference on Multimedia Computing Systems, p. 473-480; IEEE Computer Society Press, United States (1996).
Bur Goode, Voice Over Internet Protocol (VoIP), Proceedings of the IEEE, vol. 90, No, 9, Sep. 2002; pp. 1495-1517.
Carey, et al., "User Validation for Mobile Telephones," International Conference on Acoustics, Speech, and Signal Processing (ICASSP), vol. 2, Jun. 2000, pp. 1093-1096.
Chau, et al., "Building an Infrastructure for Law Enforcement Information Sharing and Collaboration: Design Issues and Challenges," National Conference on Digital Government, 2001; 6 pages.
Chaudhari, et al., "Transformation enhanced Multi-grained modeling for text-independent speaker recognition," International Conference on Spoken Language Processing, 2000, pp. 298-301.
Christel, et al., "Interactive Maps for a Digital Video Library," IEEE Special Edition on Multimedia Computing, Jan.-Mar. 2000, IEEE, United States; pp. 60-67.
Clavel, et al, "Events Detection for an Audio-Based Surveillance System," IEEE International Conference on Multimedia and Expo (ICME2005), Jul. 6-8, 2005, pp. 1306-1309.
Coden, et al., "Speech Transcript Analysis for Automatic Search," Proceedings of the 34th Hawaii International Conference on System Sciences, IEEE, 2001; 9 pages.
Coherent Announces Industry's First Remote Management System for Echo Canceller, Business Wire, Mar. 3, 1997; 3 pages.
Complaint for Patent Infringement, filed Aug. 1, 2013, *Securus Technologies, Inc.* v. *Global Tel\*Link Corporation*, Case No. 3:13-cv-03009-K (N.D. Tex.); 9 pages.
Corbato, et al., "Introduction and Overview of the MULTICS System," Proceedings—Fall Joint Computer Conference, 1965; 12 pages.
Cox, et al.; "Secure Spread Spectrum Watermarking for Multimedia," NEC Research Institute, Technical Report 95-10; Dec. 1997; 34 pages.
Defendant's Opening Claim Construction Brief, *Global Tel\*Link Corporation* v. *Securus Technologies, Inc.*, Case No. 3:14-cv-0829-K (N.D. Tex.), filed Nov. 19, 2014; 33 pages.
Defendant's Responsive Claim Construction Brief, *Global Tel\*Link Corporation* v. *Securus Technologies, Inc.*, Case: No. 3:14-cv-0829-K (N.D. Tex.), filed Dec. 10, 2014; 21 pages.
Definition of "constantly", The American Heritage Dictionary, 4th Ed. (2002); p. 306.
Definition of "logic", IEEE 100: The Authoritative Dictionary of IEEE Standard Terms, Seventh Edition, Standards Information Network, IEEE Press (2000).
Definition of "telephony", McGraw-Hill Dictionary of Scientific and Technical Terms, 6th Edition (McGraw-Hill, 2003); p. 2112.
Definition of "call data", Newton's Telecom Dictionary, 21st edition, San Francisco: CMP Books, 2005; p. 150.
Definitions of "Local Area Network (LAN)" and "Wide Area Network (WAN)," Microsoft Computer Dictionary (Microsoft Press 2002), pp. 304 and 561.
Definitions of "suspicion" and "suspect", American Heritage Dictionary, 4th Edition, New York: Houghton Mifflin, 2006; pp. 1743-1744.
Digital Copy of "Bellcore Notes on the Networks," Bellcore, Special Report SR-2275, Issue 3, Dec. 1997.
Doddington, G., "Speaker Recognition based on Idiolectal Differences between Speakers," 7th European Conference on Speech Communication and Technology, Sep. 3-7, 2001; 4 pages.
Dunn, et al., "Approaches to speaker detection and tracking in conversational speech," Digital Signal Processing, vol. 10, 2000; pp. 92-112.
Dye, Charles, "Oracle Distributed Systems," O'Reilly Media, Inc., Apr. 1, 1999; 29 pages.
Excerpts from IEEE 100: The Authoritative Dictionary of IEEE Terms, Seventh Edition, Standards Information Network, IEEE Press (2000).
Excerpts from the Prosecution History of U.S. Appl. No. 10/135,878, filed Apr. 29, 2002.
Excerpts from the Prosecution History of U.S. Pat. No. 7,899,167, U.S. Appl. No. 10/642,532, filed Aug. 15, 2003.
File History of U.S. Appl. No. 12/861,322, filed Aug. 23, 2010.
File History of U.S. Pat. No. 8,135,115, U.S. Appl. No. 11/603,938, filed Nov. 22, 2006.
File History of U.S. Pat. No. 8,577,003, U.S. Appl. No. 13/009,483, filed Jan. 19, 2011.
File History of U.S. Pat. No. 8,886,663, U.S. Appl. No. 12/284,450, filed Sep. 20, 2008.
File History of U.S. Pat. No. 9,094,500, U.S. Appl. No. 14/322,869, filed Jul. 2, 2014.
File History of U.S. Pat. No. 9,143,609, U.S. Appl. No. 13/949,980, filed Jul. 24, 2011.
Fischer, Alan D., "COPLINK nabs criminals faster," Arizona Daily Star, Jan. 7, 2001; 5 pages.
Fleischman, E., "Advanced Streaming Format (ASF) Specification," Microsoft Corporation, Jan. 9, 1998; 78 pages.
Fox, B., "The First Amendment Rights of Prisoners," 63 J. Crim. L. Criminology & Police Sci. 162, 1972; 24 pages.
Frankel, E., Audioconferencing Options (Teleconferencing Units, Conference Bridges and Service Bureaus), Teleconnect, vol. 4, No. 5, p. 131(3), May 1996; 6 pages.
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, S., "50 Years of Progress in Speech and Speaker Recognition Research," ECTI Transactions on Computer and Infomation Technology, vol. 1, No. 2, Nov. 2005, pp. 64-74.
Hansen, et al., "Speaker recognition using phoneme-specific grams," The Speaker and Language Recognition Workshop, May-Jun. 2004; 6 pages.
Hauck, et al., "Coplink: A Case of Intelligent Analysis and Knowledge Management," University of Arizona, 1999; 20 pages.
Hewett, et al., Signaling System No. 7 (SS7/C7): Protocol, Architecture,and Services (Networking Technology), Cisco Press, Jun. 2005; 8 pages.
i2 Investigative Analysis Software; "Chart Reader", URL: http://www.i2.eo.uk/Products/Chart Reader. Jun. 13, 2005.
i2 Investigative Analysis Software; "i2 TextChart—Text Visualized" URL: http://www.i2.co.uk/Products/i2TextChart/. Jun. 13, 2005.
i2 Investigative Analysis Software; "iBase-Information Captured", URL: http://www.i2.co.uk/Products/iBase/, Jun. 13, 2005.
i2 Investigative Analysis Software; "iBridge", URL: http://www.i2.eo.uk/Products/iBridge/. Jun. 13, 2005.
i2 Investigative Analysis Software; "Pattern Tracer", URL: http://www.i2.co.uk/Products/Pattern Tracer/, Jun. 13, 2005.
i2 Investigative Analysis Software; "Prisons", URL: http://www.i2.co.uk/Solutions/Prisons/default.aso. Jun. 13, 2005.
i2 Investigative Analysis Software; "Setting International Standards for Investigative Analysis", URL: htto://www.i2.co.uk/Products/index.html. Jun. 13, 2005.
IMAGIS Technologies, Inc. "Computer Arrest and Booking System", [retrieved from http://www.imagistechnologies.com/Product/CABS.htm] (Nov. 5, 2002) 5 pages.

(56) References Cited

OTHER PUBLICATIONS

IMAGIS Technologies, Inc. "Integrated Justice System—Web-based Image and Data Sharing" [retrieved from http://www.imagistechnologies.com/Product/IJISFramework.htm>] (Nov. 5, 2002) 4 pages.

Inmate Telephone Services: Large Business: Voice, Oct. 2, 2001; 3 pages.

Intel® NetStructure High-Density Station Interface (HDSI) Boards Archived Webpage, Intel Corporation, 2003; 2 pages.

International Search Report and Written Opinion directed to International Application No. PCT/US2017/022169, dated May 29, 2017; 57 pages.

International Search Report for International Application No. PCT/US04/025029, European Patent Office, Netherlands, dated Mar. 14, 2006.

Isobe, et al., "A new cohort normalization using local acoustic information for speaker verification," Proceedings of the IEEE International Conference on Acoustics, Speech, and Signal Processing, vol. 2, Mar. 1999; pp. 841-844.

Joint Claim Construction and Prehearing Statement, Exhibit B: Securus' Intrinsic and Extrinsic Evidence Charts, *Global Tel\*Link Corporation* v. *Securus Technologies, Inc.*, No. 3:14-cv-00829-K (N.D. Tex.), Sep. 26, 2014.

Juang, et al., "Automatic Speech Recognition—A Brief History of the Technology Development," Oct. 8, 2014; 24 pages.

Kinnunen, et al., "Real-Time Speaker Identification and Verification," IEEE Transactions on Audio, Speech, and Language Processing, vol. 14, No. 1, Jan. 2006, pp. 277-288.

Knox, "The Problem of Gangs and Security Threat Groups (STG's) in American Prisons Today: Recent Research Findings From the 2004 Prison Gang Survey," National Gang Crime Research Center, 2005; 67 pages.

Kozamernik, F., "Media Streaming over the Internet—an overview of delivery technologies," EBU Technical Review, Oct. 2002; 15 pages.

Lane, et al., Language Model Switching Based on Topic Detection for Dialog Speech Recognition, Proceedings of the IEEE-ICASSP, vol. 1, 2003, IEEE; pp. 616-619.

Maes, et al., "Conversational speech biometrics," E-Commerce Agents, Marketplace Solutions, Security Issues, and Supply and Demand, Springer-Verlang, London, UK, 2001, pp. 166-179.

Maes, et al., "Open Sesame! Speech, Password or Key to Secure Your Door?," Asian Conference on Computer Vision, Jan. 1998; pp. 1-3.

Matsui, et al., "Concatenated Phoneme Models for Text-Variable Speaker Recognition," International Conference on Acoustics, Speech, and Signal Processing (ICASSP), vol. 2, Apr. 1993; pp. 391-394.

McCollum, "Federal Prisoner Health Care Copayment Act of 2000," House of Representatives Report 106-851, 106th Congress 2d Session, Sep. 14, 2000; 22 pages.

Microsoft Computer Dictionary, Fifth Edition, Microsoft Computer Press: Redmond, WA, 2002; 652 pages.

Microsoft White Paper: "Integrated Justice Information Systems", retrieved from Microsoft Justice & Public Safety Solutions (Nov. 5, 2002) [http://jps.directtaps.net_vtibin/owssvr.dll?Using=Default%2ehtm]; 22 pages, Jan. 29, 2018.

Moattar, et al., "Speech Overlap Detection using Spectral Features and its Application in Speech Indexing," 2nd International Conference on Information Communication Technologies, 2006; pp. 1270-1274.

National Alliance of Gang Investigators Associations, 2005 National Gang Threat Assessment, 2005, Bureau of Justice Assistance, Office of Justice Programs, U.S. Department of Justice; 73 pages.

National Major Gang Taskforce, "A Study of Gangs and Security Threat Groups In America's Adult Prisons and Jails," 2002; 38 pages.

Navratil, et al., "A Speech Biometrics System With MultiGrained Speaker Modeling," 2000; 5 pages.

Navratil, et al., "Phonetic speaker recognition using maximum-likelihood binary-decision tree models," Proceedings of the IEEE International Conference on Acoustics, Speech, and Signal Processing, Apr. 6-10, 2003; 4 pages.

Newton's Telecom Dictionary, 18th Edition, Feb. 2002; p. 655.

Newton's Telecom Dictionary, 18th Edition, Feb. 2002; p. 168.

Office Action dated Dec. 1, 2011, in Canadian Patent Application No. 2,534,767, DSI-ITI, LLC, filed Aug. 4, 2004.

O'Harrow, R. "U.S. Backs Florida's New Counterterrorism Database; 'Matrix' Offers Law Agencies Faster Access to Americans' Personal Records"; The Washington Post. Washington, D.C., Aug. 6, 2003; p. A 01.

O'Harrow, R.. "Database will make tracking suspected terrorists easier", The Dallas Morning News, Dallas, TX, Aug. 6, 2003; p. 7A.

Olligschlaeger, A. M., "Criminal Intelligence Databases and Applications," in Marilyn B. Peterson, Bob Morehouse, and Richard Wright, Intelligence 2000: Revising the Basic Elements—A Guide for Intelligence Professionals, Mar. 30, 2000 a joint ublication of IALEIA and LEIU; 53 pages.

Original Specification as-filed Aug. 26, 2005, in U.S. Appl. No. 11/212,495 to Frost.

Original Specification as-filed Jul. 22, 2005, in U.S. Appl. No. 11/187,423 to Shaffer.

Osifchin, N., "A Telecommunications Buildings/Power Infrastructure in a New Era of Public Networking," IEEE 2000; 7 pages.

Pages from http://www.corp.att.com/history, archived by web.archive.org on Nov. 4, 2013.

Parties' Proposed Claim Constructions in *Global Tel\*Link Corporation* v. *Securus Technologies, Inc.*, No. 3:14-cv-00829-K (N.D. Tex.), filed Sep. 26, 2014; 17 pages.

Pelecanos, J. "Conversational biometrics," in Biometric Consortium Meeting, Baltimore, MD, Sep. 2006, accessible at http://www.biometrics.org/bc2006/presentations/Thu_Sep_21/Session_I/Pelecanos_Conversational_Biometrics.pdf; 14 pages.

Plaintiff's Opening Claim Construction Brief, *Global Tel\*Link Corporation* v. *Securus Technologies, Inc.*, Case No. 3:14-cv-0829-K (N.D. Tex.), filed Nov. 19, 2014.

Pollac, et al., "On the Identification of Speakers by Voice," The Journal of the Acoustical Society of America, vol. 26, No. 3, May 1954; 4 pages.

Prosecution History of International Patent Application No. PCT/US99/09493 by Brown et al., filed Apr. 29, 1999.

Prosecution History of U.S. Appl. No. 09/072,436, filed May 4, 1998.

Prosecution History of U.S. Appl. No. 11/005,816, filed Dec. 7, 2004.

Prosecution History of U.S. Appl. No. 11/045,589, filed Jan. 28, 2005.

Prosecution History of U.S. Appl. No. 11/182,625, filed Jul. 15, 2005.

Prosecution History of U.S. Appl. No. 11/479,990, filed Jun. 30, 2006.

Prosecution History of U.S. Appl. No. 11/480,258, filed Jun. 30, 2006.

Prosecution History of U.S. Appl. No. 11/609,397, filed Dec. 12, 2006.

Prosecution History of U.S. Appl. No. 12/002,507, filed Dec. 17, 2007.

Response to Office Action, filed Jan. 6, 2009, in Prosecution History of U.S. Appl. No. 10/642,532, filed Aug. 15, 2003.

Rey, R.F., ed., "Engineering and Operations in the Bell System," 2nd Edition, AT&T Bell Laboratories: Murray Hill, NJ, 1983; 884 pages.

Reynolds, D., "Automatic Speaker Recognition Using Gaussian Mixture Speaker Models," The Lincoln Laboratory Journal, vol. 8, No. 2, 1995; pp. 173-192.

Rosenberg, et al., "SIP: Session Initial Protocol," Network Working Group, Standard Track, Jun. 2002; 269 pages.

Rosenberg, et al., "The Use of Cohort Normalized Scores for Speaker Verification," Speech Research Department, AT&T Bell Laboratories; 2nd International Conference on Spoken Language Processing, Oct. 12-16, 1992; 4 pages.

(56) References Cited

OTHER PUBLICATIONS

Ross, et al., "Multimodal Biometrics: An Overview," Proc. of 12th European Signal Processing Conference (EUSIPCO), Sep. 2004; pp. 1221-1224.
Science Dynamics, BubbleLINK Software Architecture, 2003; 10 pages.
Science Dynamics, Commander Call Control System, Rev. 1.04, 2002; 16 pages.
Science Dynamics, inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_main.htm (archived by web.archive.org on Oct. 12, 2000).
Shearme, et al., "An Experiment Concerning the Recognition of Voices," Language and Speech, vol. 2, No. 3, Jul./Sep. 1959; 10 pages.
Silberg, L., Digital on Call, HFN the Weekly Newspaper for the Home Furnishing Network, Mar. 17, 1997; 4 pages.
Silberschatz, et al., Operating System Concepts, Third Edition, Addison-Wesley: Reading, MA, Sep. 1991; 700 pages.
Simmons, R., "Why 2007 is Not Like 1984: A Broader Perspective on Technology's Effect on Privacy and Fourth Amendment Jurisprudence," J. Crim. L. & Criminology vol. 97, No. 2, Winter 2007; 39 pages.
Smith, M., "Corrections Turns Over a New LEAF: Correctional Agencies Receive Assistance From the Law Enforcement Analysis Facility," Corrections Today, Oct. 1, 2001; 4 pages.
Specification of U.S. Appl. No. 10/720,848, "Information Management and Movement System and Method," to Viola, et al., filed Nov. 24, 2003.
Specification of U.S. Appl. No. 11/045,589, "Digital Telecommunications Call Management and Monitoring System," to Hodge, filed Jan. 28, 2005; 64 pages.
State of North Carolina Department of Correction RFP #ITS-000938A, issued May 25, 2004; 8 pages.
Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.
Sundstrom, K., "Voice over IP: An Engineering Analysis," Master's Thesis, Department of Electrical and Computer Engineering, University of Manitoba, Sep. 1999; 140 pages.
Supplementary European Search Report for EP Application No. EP 04 80 9530, Munich, Germany, completed on Mar. 25, 2009.
Tanenbaum, A., Modern Operating Systems, Third Edition, Peason Prentice Hall: London, 2009; 552 pages.
Tirkel, A., et al.; "Image Watermarking—A Spread Spectrum Application," Sep. 22-25, 1996; 7 pages.
U.S. Appl. No. 60/607,447, "IP-based telephony system and method," to Apple, et al., filed Sep. 3, 2004.
USPTO Class Definition, Class 379 Telephonic Communications, available at http://www.uspto.gov/web/patents/ciassification/uspc379/defs379.htm, Jan. 29, 2018.
Viswanathan, et al., "Multimedia Document Retrieval using Speech and Speaker Recognition," International Journal on Document Analysis and Recognition, Jun. 2000, vol, 2; pp. 1-24.
Walden, R., "Performance Trends for Analog-to-Digital Converters," IEEE Communications Magazine, Feb. 1999.
Weinstein, C., MIT, The Experimental integrated Switched Network—A System-Level Network Test Facility, IEEE 1983; 8 pages.
Wilkinson, Reginald A., "Visiting in Prison," Prison and Jail Administration's Practices and Theory, 1999; 7 pages.
Winterdyk et al., "Managing Prison Gangs," Journal of Criminal Justice, vol. 38, 2010; pp. 730-736.
Zajic, et al., "A Cohort Methods for Score Normalization in Speaker Verification System, Acceleration of On-Line Cohort Methods," Proceedings of the 12th International Conference "Speech and Computer," Oct. 15-18, 2007; 6 pages.
International Search Report and Written Opinion directed to International Application No. PCT/US2017/026570, dated May 8, 2017; 7 pages.

SYSTEM AND METHOD FOR THIRD PARTY MONITORING OF VOICE AND VIDEO CALLS

CROSS-REFERENCE TO RELATED APPLICATIONS

This application is a continuation application of U.S. application Ser. No. 15/594,150, now U.S. Pat. No. 9,923,936, which is a continuation application of U.S. application Ser. No. 15/331,414, filed Oct. 21, 2016, now U.S. Pat. No. 9,674,340, which is a continuation application of U.S. application Ser. No. 15/093,300 filed Apr. 7, 2016, now U.S. Pat. No. 9,609,121, each of which is incorporated herein by reference in its entirety.

BACKGROUND

Field

The disclosure relates to a monitoring system that facilitates third party monitoring of inmate audio and video communications.

Background

Correctional facilities provide inmates with the ability to communicate with friends, families, and visitors as it improves recidivism and provides incentives for inmates to follow rules and policies of the facility. In addition to traditional telephone calls and telephone visitations, correctional facilities seek to offer a wide variety of communication services to inmates, such as video visitation and video calls, among others. However, as the amount of communication options available to inmates increases, an increased amount of monitoring is required for these communications.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
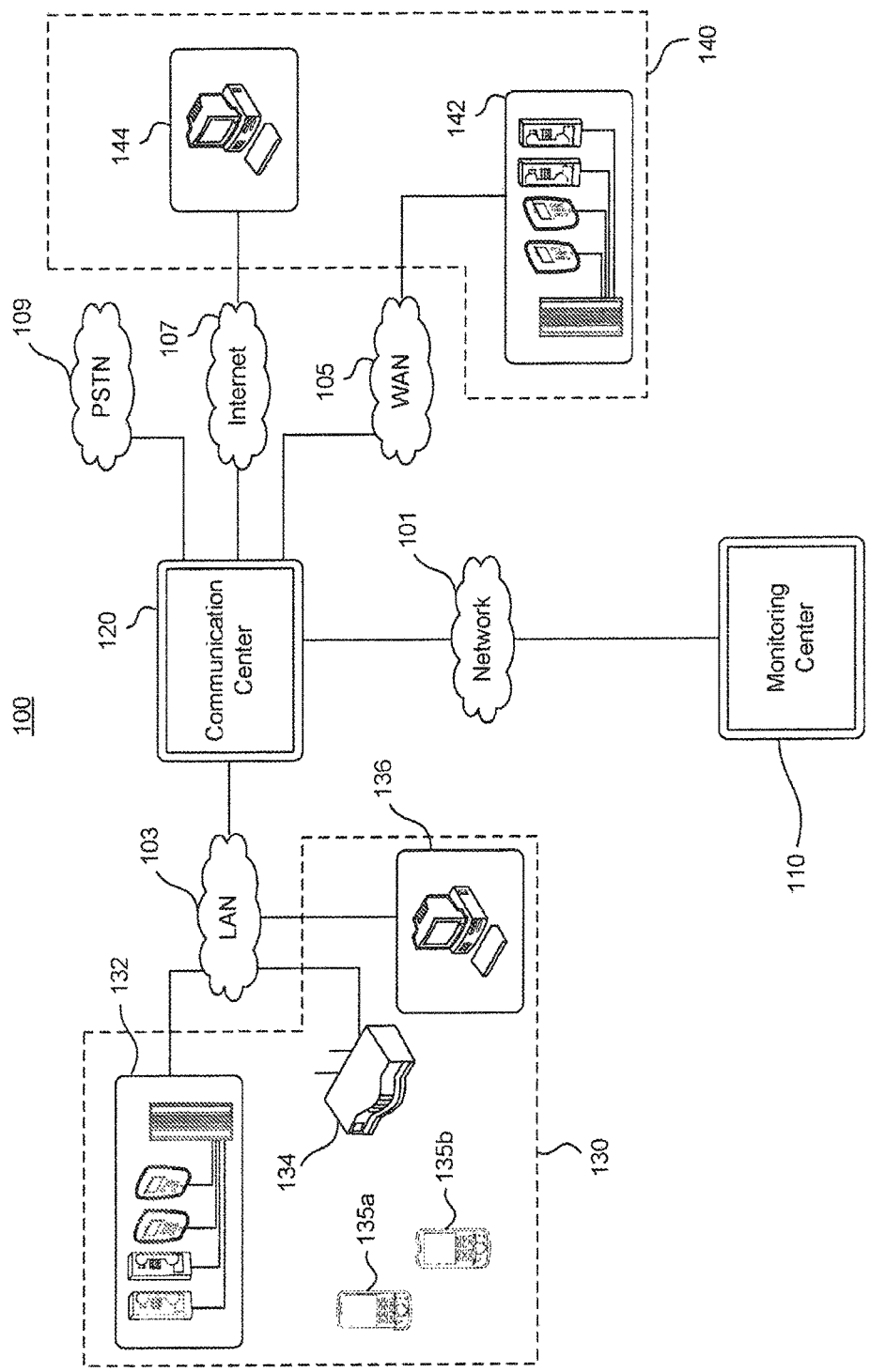
FIG. 1 illustrates a block diagram of a monitoring system, according to exemplary embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

Communication between inmates and outsiders has been shown to be an extremely important part of rehabilitation. Allowing for an inmate to keep in contact with friends and family significantly helps to reduce recidivism as well as to prepare an inmate for life after prison. Because most inmates are eventually released back into the public, any steps to minimize problems with their re-assimilation with society are highly beneficial.

Traditionally, communications between inmates and outsiders only included telephone calling and letter writing. However, over the years, newer technologies such as email, texting, and video calling have been used by correctional facilities. Typically, some form of monitoring has been used by correction facilities for all these types of communications.

In the case of telephone and video calling, a large amount of time is required to monitor the audio and video communications. Specifically, in typical monitoring systems, a reviewer, such as an officer, listens to an audio communication or watches a video communication of an inmate communicating with an outsider. In general, the monitoring systems allow the reviewer to listen to or watch a communication live and/or the communication is recorded for later review. However, most correctional facilities do not have a sufficient amount of personnel available to monitor all of the audio or video communications of inmates. Therefore, many correctional facilities typically monitor a selective amount of live communications and record all remaining communications for later review if an investigation points to a particular inmate, a phone number, or a time of day of an event. Based on the limited amount of personnel, many correctional facilities are forced to limit an amount of calls that each inmate may have during a time period (e.g., 1 call per day) and/or an amount of time that each inmate may have during a time period (e.g., 300 minutes a month).

In addition to recording communications, typical monitoring systems also have capabilities to convert speech to text which allows a reviewer to search for key words or phrases. However, many of these technologies do not go far enough to detect covert communications such as slang, jargon, or body jesters that are not typically used in describing criminal activity.

In light of the above, the present disclosure provides a system to allow a third party to monitor voice and video calls. This consists of a monitoring system that allows a reviewer to remotely listen to an audio call or watch a video call and provide alerts to either officers or administrators regarding any suspicious behavior or communication between an inmate and an outsider such as family, friends, or another inmate. By providing a monitoring system for managing the different communications, a significant burden can be removed from officers and administrators, while simultaneously increasing inmates communication time.

Monitoring System

FIG. 1 illustrates a block diagram of a monitoring system 100, according to exemplary embodiments of the present disclosure. The monitoring system 100 includes a monitoring center 110 configured to receive communication session data from a communication center 120. In this disclosure, a session refers to a communication between two parties, in particular, an audio or video communication between an inmate using an inmate communication device 130 and an outsider using a communication device 140. The session data may include the session itself and data related to the session, as will be described in further detail below. The monitoring center 110 connects to the communication center 120 via a network 101. The network 101 may include a Local-Area Network (LAN), a Wide-Area Network (WAN), or the Internet.

In an embodiment, the communication center 120 connects the inmate communication device 130 to the communication device 140, The inmate communication device 130 includes any or all devices such as an audio and video communications device(s) 132, wireless devices 135a or 135b, and/or a control station 136. The communication center 120 also connects to a wireless access point 134 (e.g., a router), which may provide connectivity to the wireless devices 135a and 135b. The communication center 120 connects to the inmate communication device 130 via a LAN 103.

The communication center 120 connects to the communication device 140 via any or all of a WAN 105, the Internet 107, and the Public Switched Telephone Network (PSTN) 109. The WAN 105 may facilitate communications with other nearby prisons, such as those within the same county, state, etc. Audio and/or video devices 142 located at those other facilities may provide cross-facility visitations between inmates. In an embodiment, WebRTC may be utilized in place of a session initiation protocol (SIP) over a WAN or the Internet, each of which provides a dedicated, private link between the inmate communication device 130 and the communication device 140.

The Internet 107 is utilized to provide access to remote stations 144 such as remotely distributed control stations, scheduling clients, and home visitation devices. The PSTN 109 can be used to provide connectivity to basic telephones and other communication devices (not shown) over traditional data networks.

Monitoring Center

Figure 2:
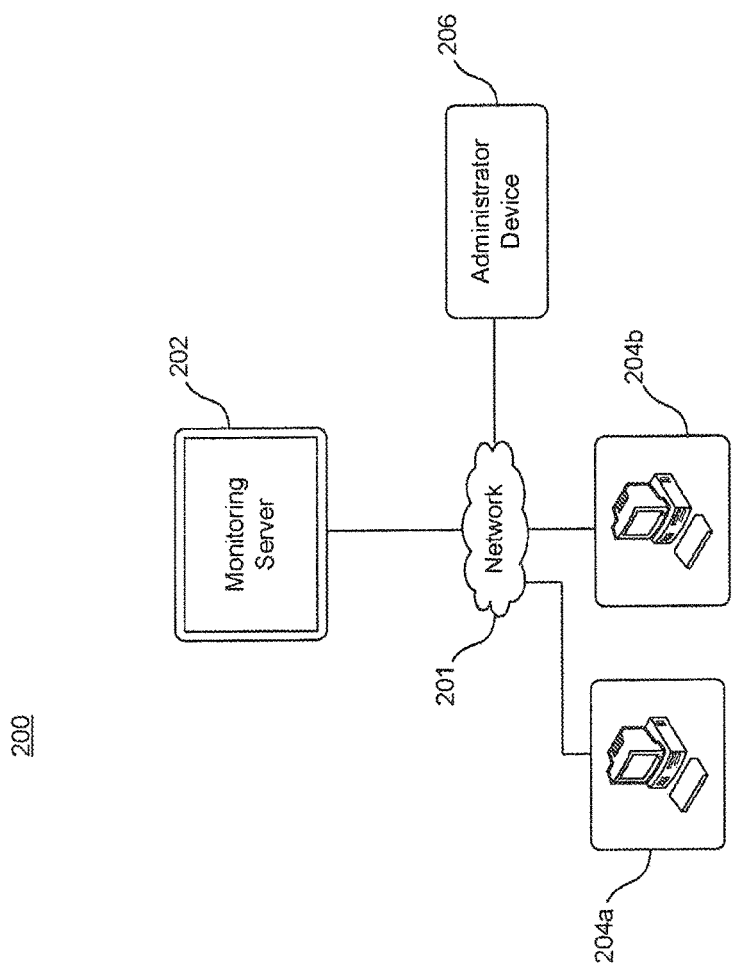
FIG. 2 illustrates a block diagram of a monitoring center, according to exemplary embodiments of the present disclosure.

FIG. 2 illustrates a block diagram of a monitoring center 200, according to exemplary embodiments of the present disclosure. The monitoring center 200 may be an exemplary embodiment of the monitoring center 110 of FIG. 1. The monitoring center 200 includes a monitoring server 202 which communicates with monitoring stations 204a and 204b and with an administrator device(s) 206. For example, the monitoring server 202 interfaces with the monitoring stations 204a and 204b and/or the administrator device(s) 206 via a network 201 when receiving session data from the communication center 120 and can transmit the session data to at least one of the monitoring stations 204*a* and 204*b* or the administrator device(s) 206.

The monitoring center 200 also allows communication between the monitoring stations 204*a* and 204*b* and the administrator device(s) 206. For example, a monitoring station 204*a* may communicate with the administrator device 206 to provide information or an alert in regards to a particular session received from the communication center 120.

In an embodiment the monitoring center 200 is further configured to interrupt and/or disconnect a communication between parties of a live communication session. For example, the monitoring stations 204*a* or 204*b* is configured to facilitate a reviewer to interrupt a communication session and issue a warning to either of or both sides of the communication session. The warning may be of the same format as the monitored communication session—voice, text (chat), or video. The occurrence of an interrupting event may be clearable in session logs. As another example, the monitoring stations 204*a* or 204*b* may be configured to disconnect a communication session between the parties, and the monitoring center may superimpose an audible or visual message that is played to the parties of the session describing the reason for the disconnection of service. A disconnection event can be clearly flagged in session logs. Further, the capability of interrupting or disconnecting a communication session may be limited to only be allowed if configured in the system on a user by user profile basis.

In an embodiment, the administrator device(s) 206 can include one or more of a phone, computer, tablet, fax machine, or pager having a capability of receiving a communication from monitoring station 204*a* or 204*b*. For example, a reviewer using the monitoring station 204*a* can send an email alert to an administrator, and the administrator can view the email alert by way of a phone, a computer, and/or a tablet that represent the administrator devices 206.

The network 201 can include a LAN, a WAN, or the Internet. Accordingly, the monitoring center 200 can be located on-site or at a remote monitoring location, and allows monitors, corrections officers, or others to monitor a session between an inmate and an outsider in real-time, on delay, or in the form of an audio or video recording.

Monitoring Server

Figure 3:
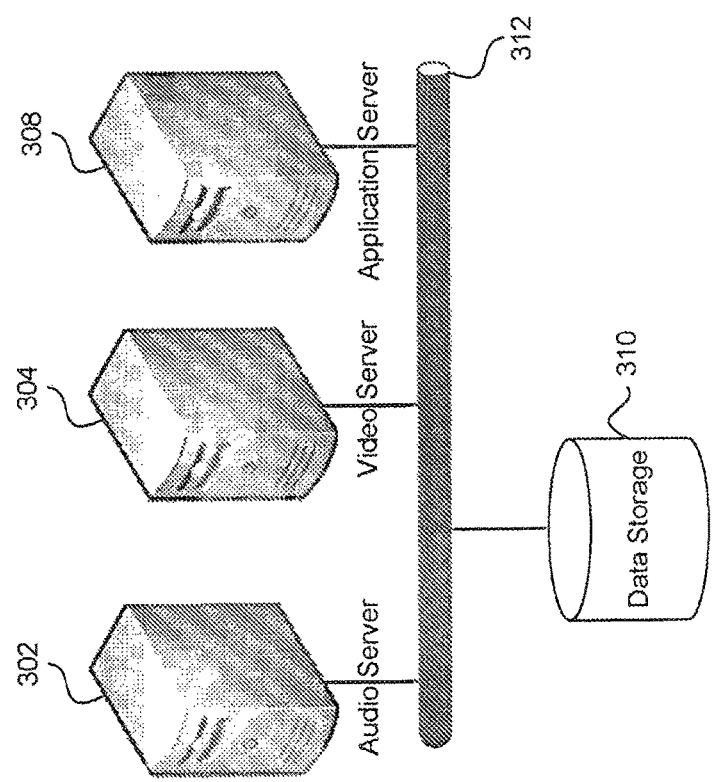
FIG. 3 illustrates a block diagram of a monitoring server, according to exemplary embodiments of the present disclosure.

FIG. 3 illustrates a block diagram of a monitoring server 300, according to exemplary embodiments of the present disclosure. The monitoring server 300 may represent an exemplary embodiment of the monitoring server 202 of FIG. 2. The monitoring server 300 includes an audio server 302, a video server 304, an application server 308, and data storage 310, that are all connected to each other via a network bus 312.

Each of the servers 302-306 can be constructed as individual physical hardware devices, or as virtual servers. The number of physical hardware machines can be scaled to match the number of simultaneous user connections desired to be supported in the monitoring system 100.

The audio server 302 can consist of any number of servers, and is configured to receive audio session data via the communication center 120. The audio server 302 supports sessions between inmates and outsiders that use audio devices such as an audio session between an inmate using the audio communication device 132 and an outsider using a telephone connected to the PSTN 109. The audio server 302 facilitates the real-time recording and delayed monitoring of audio sessions. The audio server 302 is configured to simultaneously record and transmit audio session data to the monitoring station 204*a* and/or 204*b*. For example, when an inmate uses an the audio communication device 132 to have an audio session with another inmate using the audio communication device 142, the audio server 302 receives audio session data from the communication center 120, records the audio session data, and transmits the audio session data to the monitoring station(s) 204*a* and/or 204*b*. The audio server 302 may store audio session as audio files on an internal storage or an external storage, as will be explained in more detail below.

The video server 304 can consist of any number of servers, and is configured to receive video session data via the communication center 120. The video server 304 supports video sessions between inmates and outsiders that use video devices such as a video session between an inmate using the video communication device 132 and an outsider using the video communication device 142. The video server 304 facilitates the real-time and delayed monitoring of video sessions. The video server 304 is configured to simultaneously record and transmit video session data to a monitoring station. For example, when an inmate uses the wireless device 135*a* to have a video session with a family member using the remote station 144, the video server 304 can receive video session data via the communication center 120, record the video session data, and transmit the video session data to the monitoring station(s) 204*a* and/or 204*b*. The video server 304 may store the video sessions as video files on an internal storage or an external storage, as will be explained in more detail below.

Because there may be a variety of different video communication standards employed by different video devices that wish to participate in video calls, in an embodiment, the video server 304 may also perform real-time format conversion. The conversion may convert incoming signals as needed, or may convert outgoing signals to be compatible with monitoring stations 204*a* and 204*b*.

Because the audio server 302 and the video server 304 receive and transmit session data by way of a network, in an exemplary embodiment, both the audio server 302 and the video server 304 can decrypt received session data and encrypt session data prior to transmitting the session data, for security purposes. Further, the audio server 302 and the video server 304 may record or store audio and video files on either internal storage or the data storage 310.

Figure 4:
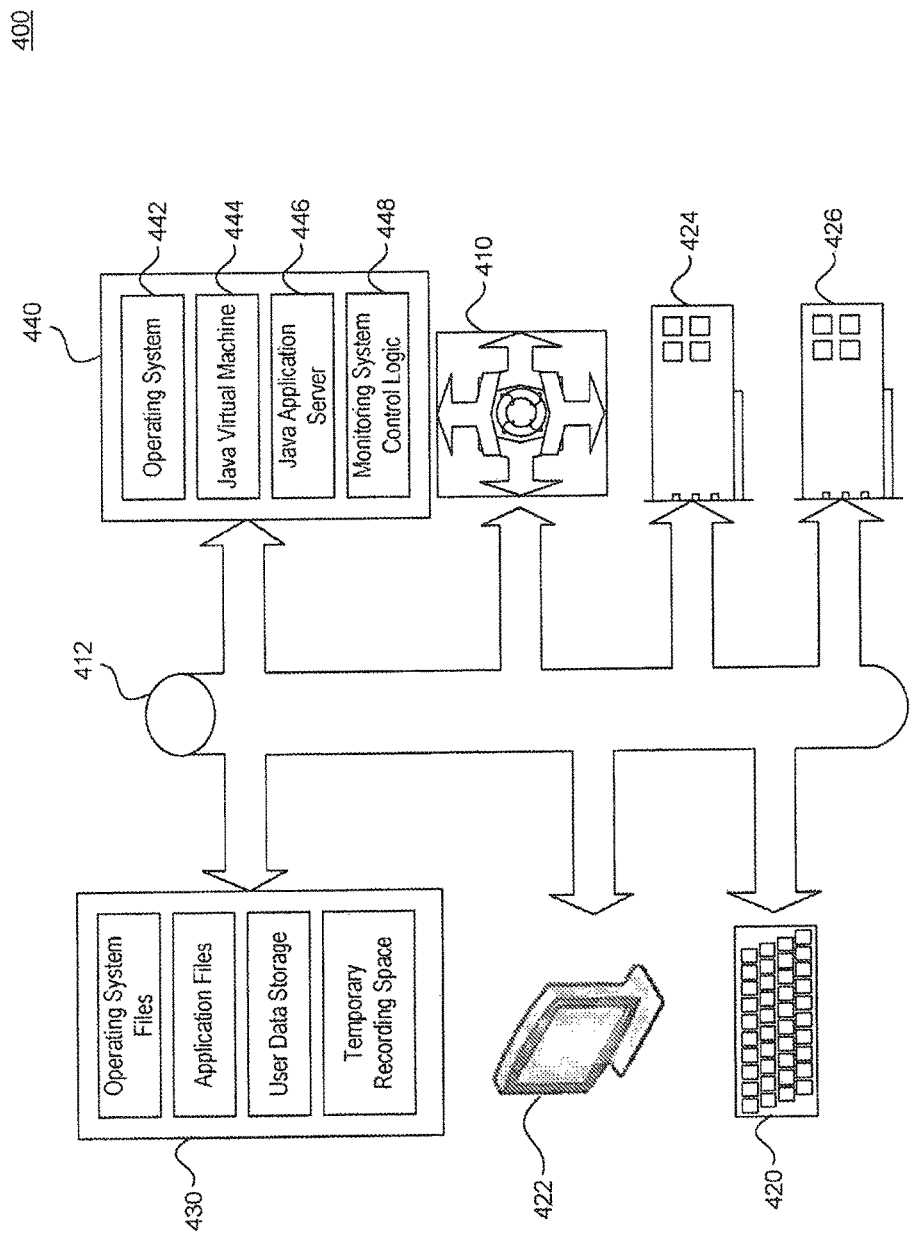
FIG. 4 illustrates an application server, according to exemplary embodiments of the present disclosure.

FIG. 4 illustrates an application server 400, according to exemplary embodiments of the present disclosure. The application server 400 may represent an exemplary embodiment of the application server 308 depicted in FIG. 3. The application server 400 functions as the primary logic processing center in the monitoring system 100. The application server 400 includes one or more central processing units (CPU) 410 connected via a bus 412 to several other peripherals. Such peripherals include an input device, such as a keyboard and/or mouse 420, a monitor 422 for displaying information, a network interface card 424 and/or a modem 426 that provide network connectivity and communication.

The application server 400 also includes internal data storage 430. This data storage 430 is non-volatile storage, such as one or more magnetic hard disk drives (HDDs) and/or one or more solid state drives (SSDs). The data storage 430 is used to store a variety of important files, documents, or other digital information, such as the operating system files, application files, user data, and/or temporary recording space.

The application server 400 also includes system memory 440. The system memory 440 is preferably faster and more efficient than the data storage 430, and is configured as random access memory (RAM) in an embodiment. The system memory 440 contains the runtime environment of the application server, storing temporary data for any of the operating system 442, java virtual machine 444, java application server 446, and monitoring control logic 448.

Figure 5:
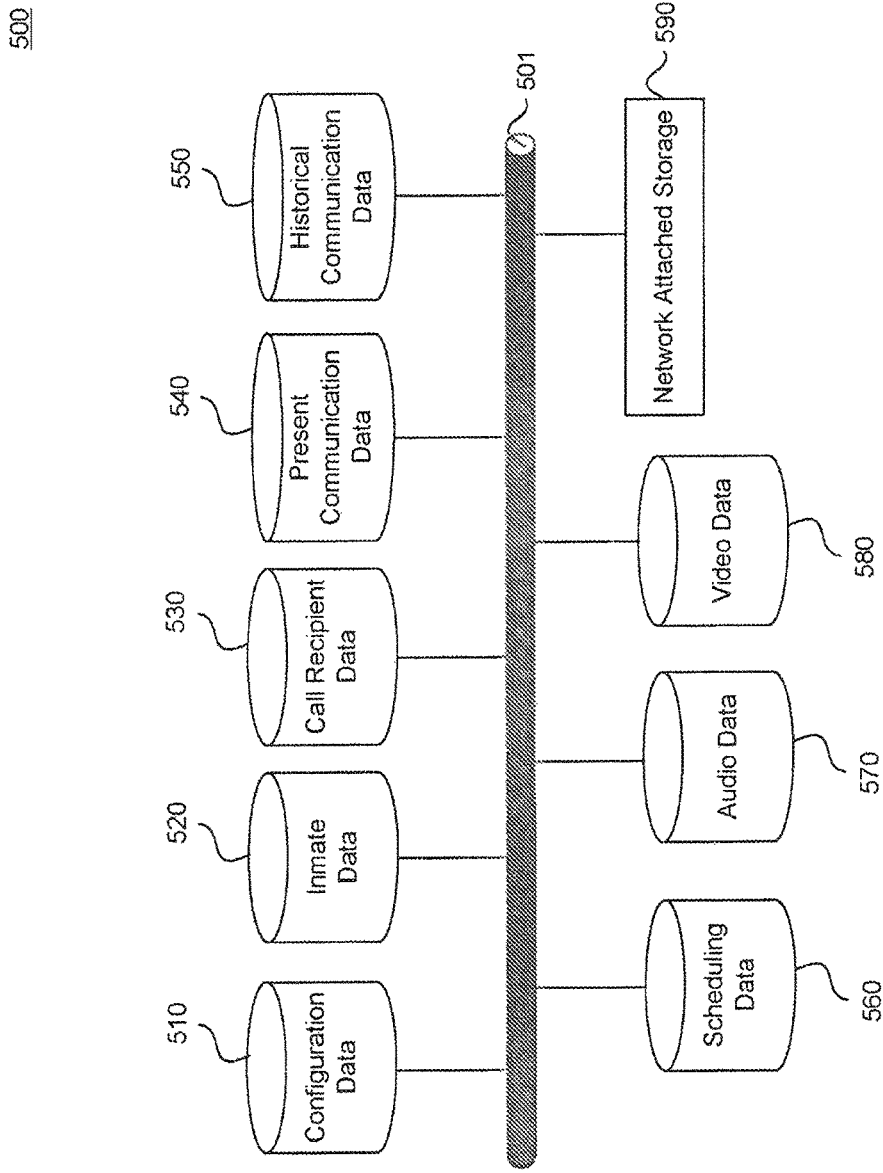
FIG. 5 illustrates a block diagram of storage devices, according to exemplary embodiments of the present disclosure.

FIG. 5 illustrates a block diagram of storage devices 500, according to exemplary embodiments of the present disclosure. The storage devices 500 may represent an exemplary embodiment of the data storage 310 of FIG. 3.

As shown in FIG. 5, the storage devices 500 provide access to a wide variety of data. The configuration data store 510 allows the system to be configured with a variety of different hardware types and manufacturers, and allow for more error-free interface and monitoring at the monitoring stations 204a and 204b. The configuration data store 510 may also include the connection details of one or more hardware devices anticipated to be used for audio or video sessions received from the communication center 120, such as the video and audio servers, web servers, application servers, and remote devices. Inmate data store 520 includes information about individual inmates, such as name, address, commitment information, etc. The inmate data store 520 may also include information relating to the case workers or correctional officers assigned to the inmate. These records may be directly entered, or may be obtained from an Inmate Telephone System, Jail Management System, or the communication system 120.

Although information regarding an outsider may be directly stored in the respective databases, an outsider data store 530 may be provided in an embodiment to separately store outsider information. The outsider information may include a name or identity and/or contact information, such as phone or address, of the outsider that is communicating with the inmate. The outsider information may also be identified in various ones of the data stores 510-580 by name or identifier only and this name/identifier may include a link to full biographical information of the outsider in the outsider data store 530.

Real-time communication data store 540 receives and temporarily stores information regarding a current ongoing session. The real-time communication information is received from the communication center 120 and may include session annotations, bookmarks, or alerts from a reviewer and/or connection data regarding a currently reviewed audio or video session. For example, the real-time communication data store 540 can receive session data regarding a detected three-way call in an audio session, such as by the detection of a hook-flash or other indicating event, and/or any other event that can be generated by a telephone.

Historical communication data store 550 stores information relating to prior audio and video sessions. The information included within these records can consist of prior session data of the inmate involved in the session, the outsider, the resources used for prior calls, including the type of devices used by each of the parties, the date/time of the audio or video sessions, the duration, etc. This information can be populated by the application server 400 by tracking and monitoring visits, and recording the data associated therewith.

Scheduling data store 560 stores session events that have not yet occurred as well as historical session information (e.g., session records). In this regard, the scheduling data store 560 stores a calendar of scheduled sessions, as well as information relating to those scheduled sessions, such as the parties to be involved, their contact information, and the communication devices to be used by those individuals. The session schedule records may include links to data relating to any of the involved parties, including inmates, visitors, and correctional staff (if needed). In an embodiment, a separate data store can be used to store the session records, Further, in an embodiment, the session records may include a link to the original session reservation, any recordings or transcripts of the session, and/or a list of the actual resources used, if they differ from the scheduled resources.

The scheduling data store 560 also stores monitoring station assignments including historical, present, and future assignments for reviewers. In particular, the monitoring station assignments can include information indicating audio or video sessions that have or will be reviewed, the identity of reviewer(s) that have been or are scheduled to review the audio or video sessions, monitoring station identification, date/time and duration of a review, etc.

Audio data store 570 can store audio files created from the audio session data received from the communication center 120. The audio data store 570 can also store modified audio files such as those that have been reviewed and annotated. The audio data store 570 may function as a temporary storage for an audio file in situations such as during creation of a non-modified audio file or modified audio file. The audio data store 570 may be used as the primary storage for the audio server 302 or used as a backup for the audio server 302.

Video data store 580 can store video files created from the video session data received from the communication center 120. The video data store 580 can also store modified video files such as those that have been reviewed and annotated. The video data store 580 may function as a temporary storage for a video file in situations such as during creation of a non-modified video file or modified video file. The video data store 580 may be used as the primary storage for the video server 304 or used as a backup for the video server 304.

Because the data stored on the data stores 510-580, especially audio and video files, consume significant amounts of storage space, this data can be stored on a Network Attached Storage (NAS) device 590 configured as a mass storage device. The data stores 510-580 may include links and/or pointers to recording data located on the NAS device 590. In order to reduce the required size of the NAS device 590, the NAS device preferably includes a backup routine to transfer recording data to permanent storage devices, such as archival permanent storage or optical disks, after a predetermined time has elapsed since the initial recording of that data. The NAS device 590 is connected to the data stores by way of the network 501.

Monitoring Station

Figure 6:
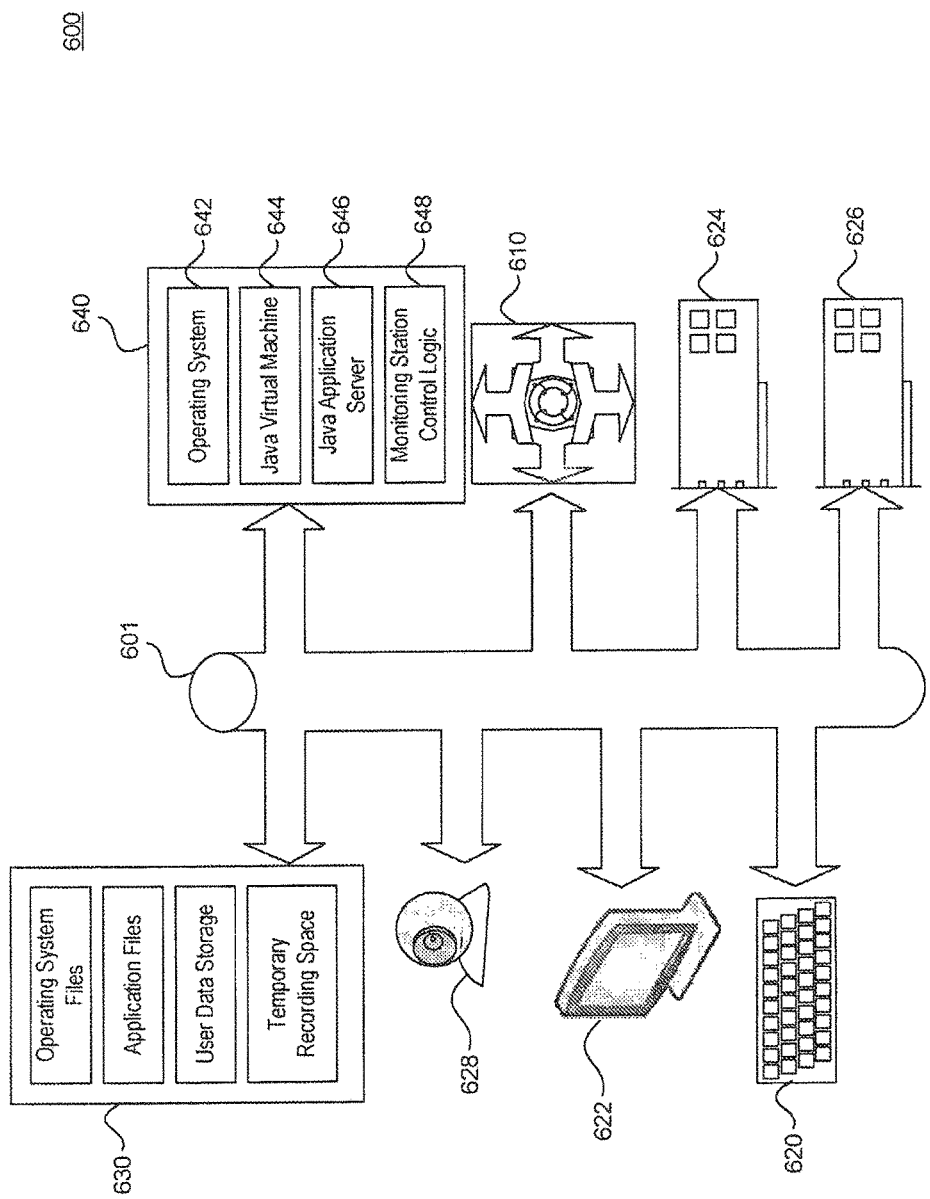
FIG. 6 illustrates a monitoring station, according to exemplary embodiments of the present disclosure.

FIG. 6 illustrates a monitoring station 600, according to exemplary embodiments of the present disclosure. The monitoring station 600 may be an exemplary embodiment of the monitoring station 204a or 204b of FIG. 2. The monitoring station 600 functions as a remote reviewing center in the monitoring system 100. The monitoring station 600 may include a computer, tablet, or phone capable of viewing a user interface and includes one or more central processing units (CPU) 610 connected via a bus 601 to several other peripherals. Such peripherals include an input device, such as a keyboard and/or mouse 620 and a camera and/or microphone 628, a monitor 622 for displaying a user interface (e.g., FIG. 7), a network interface card 624 and/or a modem 626 that provide network connectivity and communication.

The monitoring station 600 also includes internal data storage 630. This data storage 630 is non-volatile storage, such as one or more magnetic hard disk drives (HDDs) or solid state drives (SSDs). The data storage 630 is used to store a variety of important files, documents, or other digital information, such as the operating system files, application files, user data, and/or temporary recording space.

The monitoring station 600 also includes system memory 640. The system memory 640 is preferably faster and more efficient than the data storage 630, and is configured as random access memory (RAM) in an embodiment. The system memory 640 contains the runtime environment of the monitoring station, storing temporary data for any of the operating system 642, java virtual machine 644, java application server 646, and monitoring station control logic 648.

Figure 7:
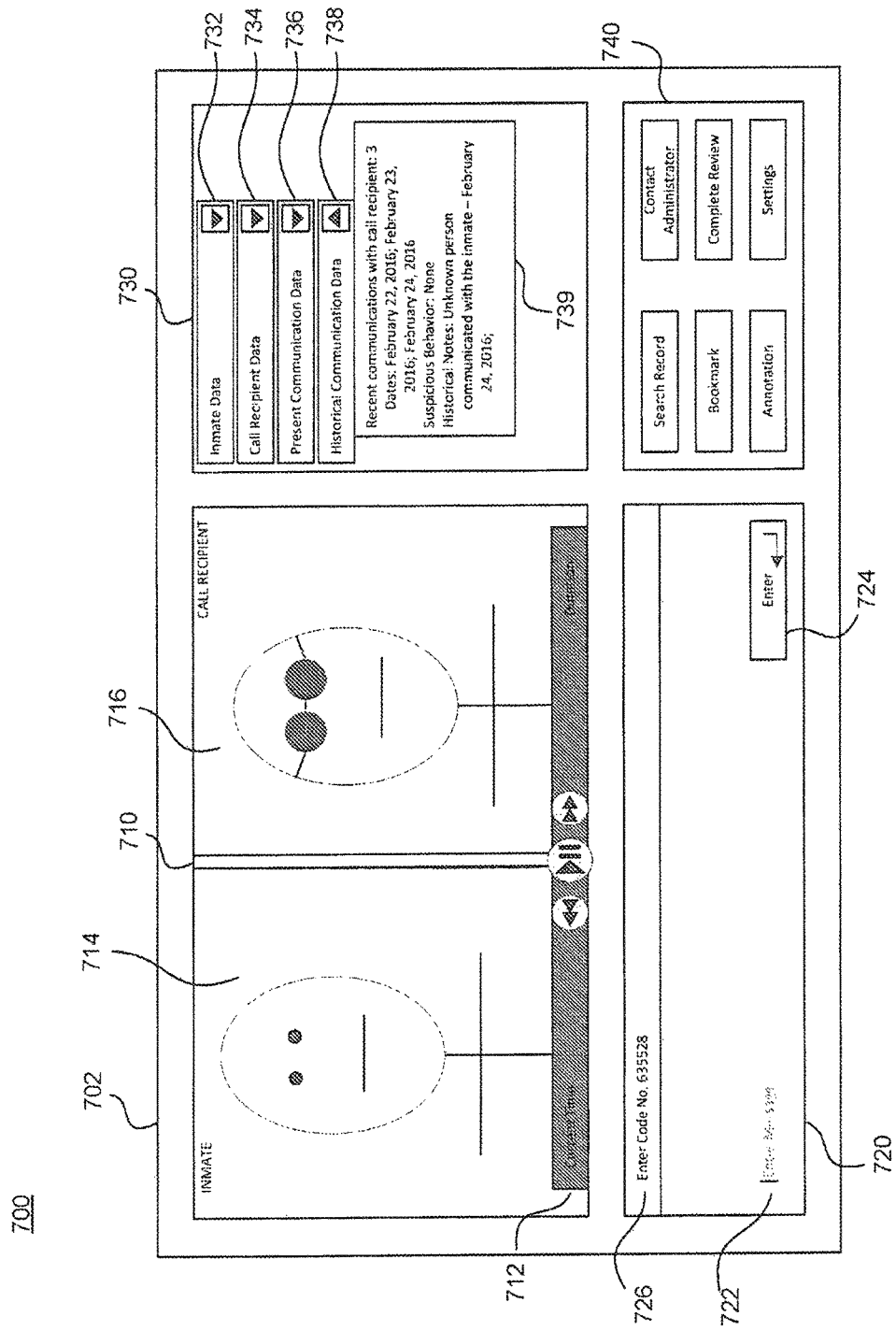
FIG. 7 illustrates a user interface of a monitoring station, according to exemplary embodiments of the present disclosure.

FIG. 7 illustrates a user interface 700 of a monitoring station, according to exemplary embodiments of the present disclosure. The user interface 700 may represent an exemplary embodiment of a user interface for the monitoring station 600 of FIG. 6. The user interface 700 includes an interface window 702 having different panels to facilitate review of a session between an inmate and an outsider. The interface window 702 includes a communication panel 710, a message panel 720, a data panel 730, and a control panel 740. The communication panel 710 includes a recordation panel 712 used to play, pause, rewind, and fast forward a communication. The recordation panel 712 includes time indicators such as a current time or a duration of the communication. For video calls, the communication panel 710 includes multiple screens 714 and 716 to show the inmate and the outsider. The screens 714 and 716 may include indicators of the inmate's name and the outsider's name and/or other identifying information of the parties involved.

The message panel 720 facilitates a reviewer in taking notes during a communication. The message panel 720 may include an outgoing message area 722 where a reviewer inserts a message by way of a input device, such as the keyboard 620 of FIG. 6. The outgoing message area 722 facilitates a reviewer in performing tasks such as entering a message into a record or sending a message to an administrator when the reviewer presses the enter button 724. The message panel 720 also includes an incoming message window 726 that displays messages received from the monitoring server 202. For example, the incoming message window 726 can display a code that the reviewer has to enter into the message area 722 to verify that a reviewer is performing monitoring duties. The incoming message window 726 may also display annotations/bookmarks or alerts created by a previous reviewer or that were automatically created by the audio server 302 or the video server 304 so as to alert the reviewer to suspicious behavior occurring at a particular time in the call. For example, while a reviewer is reviewing a session, the incoming message window 726 can display an annotation at a time during the session that a previous reviewer made the annotation.

The data panel 730 provides a reviewer with access to data that may be necessary for monitoring a communication. The data panel 730 is populated by data from the data stores 510-590. The data panel 730 can include an inmate data button 732, an outsider data button 734, a real-time communication data button 736, and a historical communications data button 738. When a reviewer pushes one of the buttons, data pertaining to the specific button is viewed in a data window. For example, as shown by FIG. 7, a reviewer may view historical communications of the inmate by clicking on the historical communications data button 738 to view data in the viewing window 739 pertaining to prior communications. The data viewed in the data window, for example viewing window 739, is populated from data stored on a data storage used by the monitoring server 202.

The control panel 740 includes controls for performing tasks while a reviewer monitors a session. The control panel 740 can include buttons for searching a record of the inmate, creating a bookmark at a specific time of the communication, creating an annotation at a specific time of the communication, contacting an administrator of the inmate, completing the review, and/or changing settings.

Monitoring Center Operation

Figure 8:
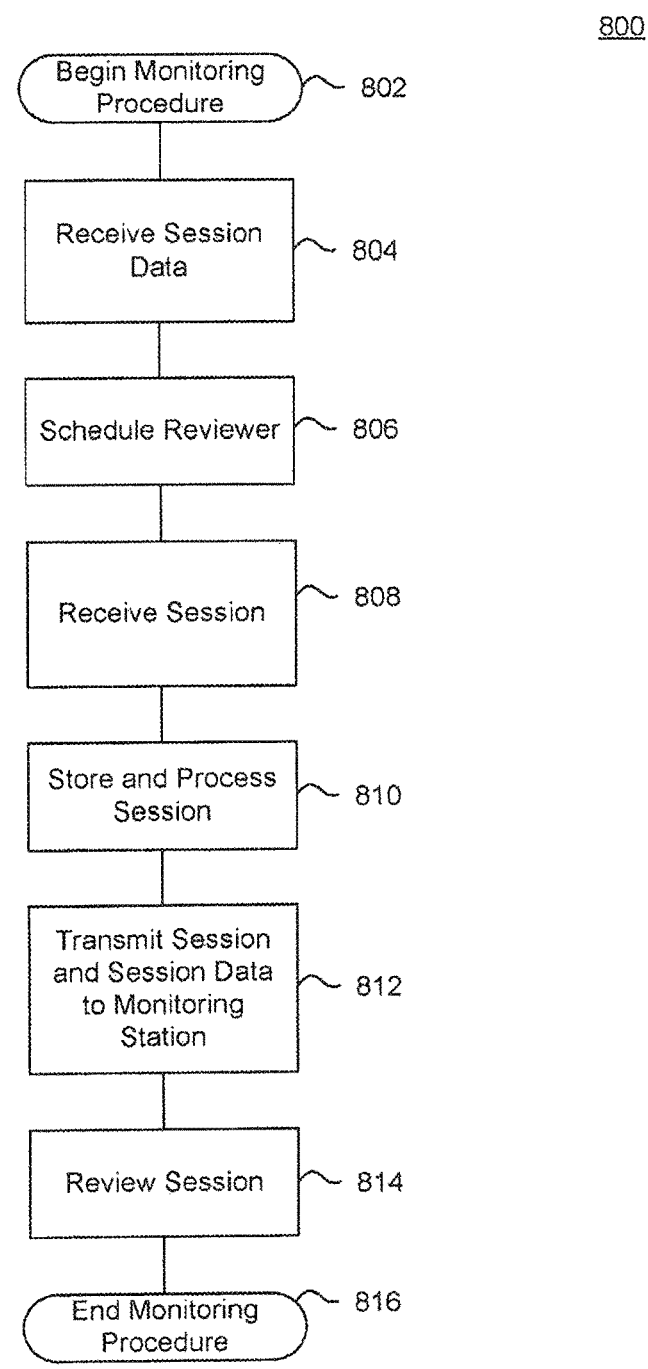
FIG. 8 illustrates a flowchart diagram of a method for monitoring a call, according to exemplary embodiments of the present disclosure.

The monitoring center 200 provides monitoring capabilities for a third party reviewer and capabilities in supervising the reviewer. An operation of the monitoring center 200 will be described with respect to FIG. 8, which illustrates a flowchart diagram of a method 800 for monitoring a call, according to exemplary embodiments of the present disclosure. Although the physical devices and components that form the system have largely already been described, additional details regarding their more nuanced operation will be described below with respect to FIGS. 1-7.

The monitoring center 200 begins a monitoring, procedure (802). The monitoring server 202 receives session data associated with a scheduled session, either voice or video session, from the communication center 100 (840). In an embodiment, the session data may be received prior to the session or simultaneously with the session. However, as described for this exemplary embodiment, the session data is received prior to receipt of an associated session. Upon receiving the session data, the monitoring center may assign an identification to the session data. The identification is used for scheduling purposes and associates a scheduled session to inmate records.

The monitoring server 202 then schedules a reviewer to the scheduled session (806). In scheduling a reviewer, the monitoring server 202 coordinates between such stored data as the inmate data, reviewer availability, outsider data, or historical communication data. For example, the monitoring server 202 can schedule a reviewer based on whether a real-time monitoring is required for a particular inmate or outsider per the data stored in the inmate data store 520, the outsider data store 530, and the historical communication data store 550.

The monitoring server 202 receives the scheduled session (808) and begins recording and processing the session and session data (810). For example, monitoring server 202 can process the session to link present communication data received such that the inmate's phone number and the outsider's phone number are linked to the session. Further, the monitoring, server 202 can process the session by inserting timestamps within or retrieving timestamps from a session file. For example, the monitoring server 202 can insert a timestamp at predetermined segment lengths (e.g., every 10 seconds) of the session. The timestamps facilitate synchronization with annotation, bookmarks, alerts, etc. received from monitoring stations such that annotations/bookmarks/alerts from multiple reviewers may be viewed according to the time created in relation to the session. During the storing and processing of the session, the monitoring server 202 can simultaneously transmit the session data to at least one of the monitoring stations 204a and/or 204b (812).

Next, the session is reviewed at the monitoring station(s) 204a and/or 204b by a reviewer at 814. During the review of the session, which may be real-time or pre-recorded, the reviewer, by way of the user interface 700, can pause, rewind, and fast forward the session. Using the monitoring station, the reviewer can also view inmate data, outsider data, real-time communication data, and/or historical communication data if needed on the user interface.

As will be explained in more detail below, the monitoring server 202 and the monitoring stations 204a and 204b may further monitor the reviewer's progress on reviewing the session (814). After the session has been reviewed at (814), the monitoring server 202 ends the monitoring procedure (816).

Figure 9:
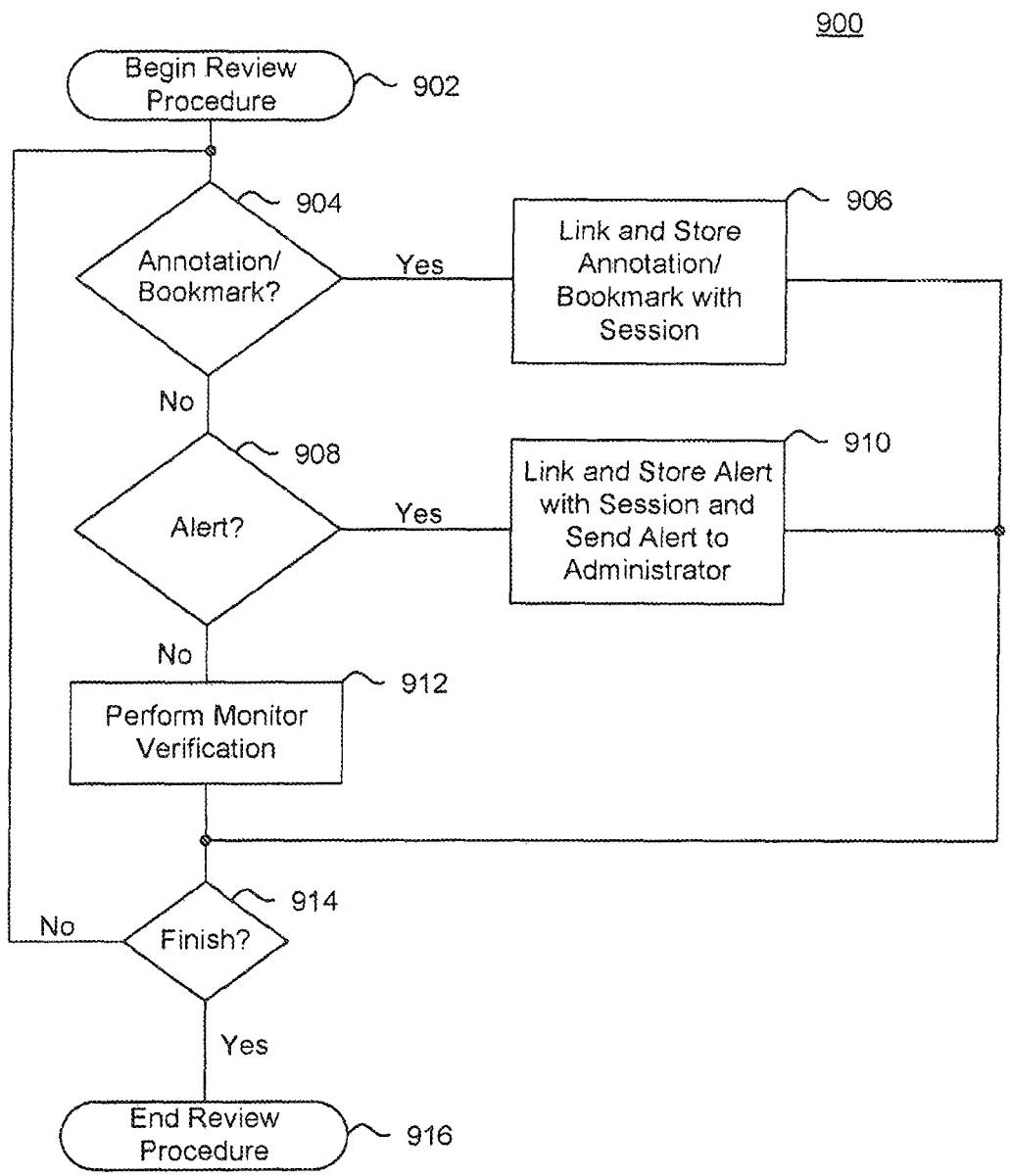
FIG. 9 illustrates a flowchart diagram of a method for reviewing a call and monitoring a reviewer, according to exemplary embodiments of the present disclosure.

FIG. 9 illustrates a flowchart diagram of a method 900 for reviewing a session and monitoring a reviewer, according to exemplary embodiments of the present disclosure. The method 900 may represent an exemplary embodiment of reviewing of a session (814) of FIG. 8. A review procedure can be performed by the monitoring server 202 and a monitoring station or by a monitoring station alone, as will be described in detail below, The following description will discuss a review procedure performed by the monitoring server 202 in conjunction with a monitoring station. When the monitoring server 202 transmits a session, either real-time or pre-recorded, and session data to a monitoring station, such as monitoring stations 204a and/or 204b, the review procedure begins (902).

The monitoring server 202 determines whether input data, such as an annotation, a flag, or a bookmark, has been received from the monitoring station 204a or 204b. If determined that an annotation/bookmark has been received, the monitoring server 202 stores the annotation/bookmark, tags the annotation/bookmark with an identifier, and links the annotation/bookmark with the session (906) such that the annotation/bookmark can be viewed separate from the session or viewed in conjunction with the session at the associated time of the session when the annotation/bookmark was created. The monitoring server 202 can match a timestamp of the session with a timestamp of when the annotation/bookmark was made by the reviewer. Synchronizing the annotation/bookmark facilitates future review of the session along with the annotation/bookmark. For example, if a first reviewer using monitor station 204a makes an annotation at a timestamp of 3 minutes in the call, a second reviewer can either view the annotation as a separate note or view the annotation in the incoming message screen 726 of FIG. 7 at the 3 minute mark of the session.

After storing and linking the annotation/bookmark, the monitoring server 202 determines whether the review procedure is finished (914). The determination of whether the review is finished can be based on multiple factors. Such factors may include whether the communication has ended and/or whether the reviewer has ended the monitoring session.

If no annotation/bookmark have been received, the monitoring server 202 determines whether additional input data such as an alert has been received (908) from the monitoring station 204a or 204b. If determined that an alert has been received, the monitoring server 202 stores the alert and links the alert with the call (910). Similar to a received annotation/bookmark, the monitoring server 202 synchronizes an alert such that the alert can be viewed at a particular time of the session when viewed at a later time. After storing and linking the alert, the monitoring system 202 determines whether the review procedure is finished (914).

Aside from providing recorded notes of a session, the annotations, bookmarks, and alerts also facilitate the monitoring of a reviewer. For example, when an annotation is received from a monitoring station, the monitoring server 202 determines that the reviewer is attentive and reviewing the session. However, when neither an annotation, bookmark, or an alert is received from a monitoring station within a predetermined time, the monitoring server 202 presumes that the reviewer is not properly monitoring the session. Accordingly, the monitoring server 202 can perform a monitor verification (912). The verification may be perfoined by the monitoring server 202 transmitting a verification command the monitoring station and requiring that the reviewer perform a simple task. The verification command may require a reviewer at the monitoring station 204a or 204b to perform a task. For example, the monitoring server 202 may transmit a message, such as shown in the incoming message window 726 of FIG. 7, that requires the reviewer to enter a code. As another example, the reviewer may be required to perform a biometric verification such as looking/speaking into a camera/microphone (e.g., the camera/microphone 628 of FIG. 6) for retinal, facial, and/or voice verification. The monitoring station 204a or 204b transmits a response to the verification command and based on whether the task is completed, the monitoring system can determine whether or not to finish, the review procedure (914).

In an embodiment, the review process may be performed entirely by a monitoring station. For example, the monitoring station 204a may receive a session, either real-time or pre-recorded, and begin the review procedure (902). In receiving the session, the monitoring station 204a can download the session on to a local storage of the monitoring station 204a. Next, the monitoring station 204a can determine whether an annotation/bookmark is input by a reviewer (904). When determined that an annotation/bookmark has been input, the monitoring station 204a can store the annotation/bookmark on a local storage, tag the annotation/bookmark with an identifier, and synchronize the annotation/bookmark, by timestamp, with the session. Similarly, the monitoring station 204a can determine whether the reviewer wants to send an alert to an administrator (908). If determined that an alert is to be sent, the monitoring station 204a stores the alert on a local storage, tags the alert by an identifier, links the alert to a timestamp of the session, and sends the alert to the administrator.

Similar to the monitoring server 202, if no annotation/bookmark has been inputted or no alert has been submitted, the monitoring station 204a can perform a monitor verification (912) to determine whether the reviewer is attentive. The monitoring station 204a can determine whether the reviewer is being attentive based on the results of the monitor verification.

When the monitoring station 204a has determined that the review is finished (914), the monitoring station 204a uploads the annotations, bookmarks, and alerts to the monitoring server 202, and the review procedure is finished (916).

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 10:
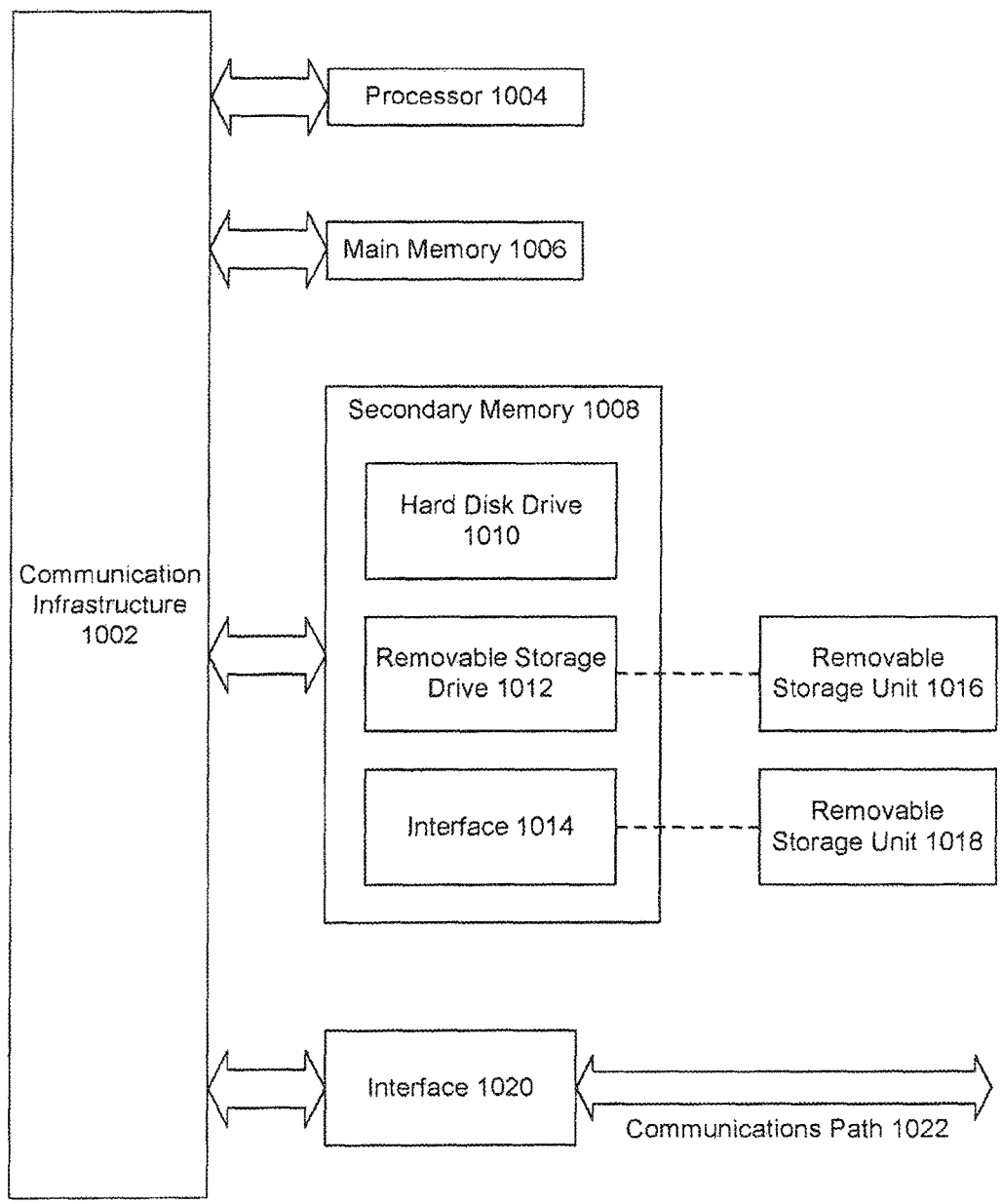
FIG. 10 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 8 and 9 can be implemented in the environment of one or more computer systems or other processing systems. An example of such a computer system 1000 is shown in FIG. 10. One or more of the modules depicted in the previous figures can be at least partially implemented on one or more distinct computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in, main memory 1006 and/or secondary memory 1008, Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A monitoring center for monitoring a review of an inmate communication session, the monitoring center comprising:
    a monitoring server configured to schedule a reviewer from among a plurality of reviewers to monitor the inmate communication session; and
    a monitoring station configured to require the reviewer to perform a task to determine whether the reviewer is monitoring the inmate communication session when data relating to the inmate communication session has not been received from the reviewer within a predetermined amount of time.

2. The monitoring center of claim 1, wherein the data comprises:
    an alert notifying of suspicious behavior occurring within the inmate communication session;
    an annotation notifying of the suspicious behavior; or
    a bookmark notifying of the suspicious behavior.

3. The monitoring center of claim 1, wherein the monitoring server is further configured to monitor whether the data has been received from the reviewer at the monitoring station within the predetermined amount of time.

4. The monitoring center of claim 1, wherein the task comprises:
   entry of a response to a question by the reviewer;
   entry of a code by the reviewer; or
   entry of a biometric verification by the reviewer.

5. The monitoring center of claim 1, wherein the monitoring server is further configured to generate a schedule, the schedule including a designation of the reviewer or a monitoring station associated with the reviewer to review the inmate communication session.

6. The monitoring center of claim 1, wherein the monitoring server is configured to schedule the reviewer in accordance with data relating to one or more parties associated with the inmate communication session, data relating to an availability of the plurality of reviewers, or data relating to one or more previous inmate communication sessions.

7. The monitoring center of claim 1, wherein the monitoring station comprises:
   a network interface device configured to receive the inmate communication session from the monitoring server; and
   at least one processor, associated with the network interface device, configured to require the reviewer to perform a task to determine whether the reviewer is monitoring the inmate communication session when the data has not been received from the reviewer within the predetermined amount of time.

8. The monitoring center of claim 7, wherein the monitoring station is associated with a user interface, the user interface comprising:
   a control panel including one or more controls to facilitate review of the inmate communication session by the reviewer; and
   a message panel configured to receive input from the reviewer in response to the reviewer performing the task.

9. The monitoring center of claim 1, wherein the monitoring station is configured to perform an action affecting the inmate communication session in response to the data being received from the reviewer within the predetermined amount of time.

10. The monitoring center of claim 9, wherein the action comprises:
    an interruption of the inmate communication session;
    an issuance of a warning to one or more parties of the inmate communication session;
    a disconnection of the inmate communication session; or
    a superimposition of an audible or visual message into the inmate communication session to describe a reason for the disconnection.

11. A monitoring station for monitoring a review of an inmate communication session, the monitoring station comprising:
    a network interface device configured to receive the inmate communication session; and
    at least one processor, associated with the network interface device, configured to require the reviewer to perform a task to determine whether a reviewer is monitoring the inmate communication session when data relating to the inmate communication session has not been received from the reviewer within a predetermined amount of time,
    wherein the reviewer is scheduled from among a plurality of reviewers to monitor the inmate communication session.

12. The monitoring station of claim 11, wherein the data comprises:
    an alert notifying of suspicious behavior occurring within the inmate communication session;
    an annotation notifying of the suspicious behavior; or
    a bookmark notifying of the suspicious behavior.

13. The monitoring station of claim 11, wherein the at least one processor is further configured to monitor whether the data has been received from the reviewer within the predetermined amount of time.

14. The monitoring station of claim 11, wherein the task comprises:
    entry of a response to a question by the reviewer;
    entry of a code by the reviewer; or
    entry of a biometric verification by the reviewer.

15. The monitoring station of claim 11, wherein the reviewer is scheduled in accordance with data relating to one or more parties associated with the inmate communication session, data relating to an availability of the plurality of reviewers, or data relating to one or more previous inmate communication sessions.

16. The monitoring station of claim 11, wherein the network interface device is configured to receive the inmate communication session from a monitoring server communicatively coupled to the monitoring station, and
    wherein the monitoring server is configured to schedule the reviewer to monitor the inmate communication session.

17. The monitoring station of claim 11, wherein the monitoring station is associated with a user interface, the user interface comprising:
    a control panel including one or more controls to facilitate review of the inmate communication session by the reviewer; and
    a message panel configured to receive input from the reviewer in response to the reviewer performing the task.

18. The monitoring station of claim 11, wherein the monitoring station is configured to perform an action affecting the inmate communication session in response to the data being received from the reviewer within the predetermined amount of time.

19. The monitoring station of claim 18, wherein the action comprises:
    an interruption of the inmate communication session;
    an issuance of a warning to one or more parties of the inmate communication session;
    a disconnection of the inmate communication session; or
    a superimposition of an audible or visual message into the inmate communication session to describe a reason for the disconnection.

20. A monitoring server for monitoring a review of an inmate communication session, the monitoring server comprising:
    a network interface device configured to receive the inmate communication session; and
    at least one processor, associated with the network interface device, configured to:
      schedule a reviewer from among a plurality of reviewers to monitor the inmate communication session, and
      receive data relating to a task performed by the reviewer, the reviewer being required to perform the task when data relating to the inmate communication session has not been received from the reviewer within a predetermined amount of time.

21. The monitoring server of claim 20, wherein the data relating to the inmate communication session comprises:
   an alert notifying of suspicious behavior occurring within the inmate communication session;
   an annotation notifying of the suspicious behavior; or
   a bookmark notifying of the suspicious behavior.

22. The monitoring server of claim 20, wherein the at least one processor is further configured to monitor whether the data relating to the inmate communication session has been received from the reviewer within the predetermined amount of time.

23. The monitoring server of claim 20, wherein the task comprises:
   entry of a response to a question by the reviewer;
   entry of a code by the reviewer; or
   entry of a biometric verification by the reviewer.

24. The monitoring server of claim 20, wherein the at least one processor is configured to schedule the reviewer in accordance with data relating to one or more parties associated with the inmate communication session, data relating to an availability of the plurality of reviewers, or data relating to one or more previous inmate communication sessions.

25. The monitoring server of claim 20, wherein the at least one processor is further configured to perform an action affecting the inmate communication session in response to the data being received from the reviewer within the predetermined amount of time.

26. The monitoring server of claim 25, wherein the action comprises:
   an interruption of the inmate communication session;
   an issuance of a warning to one or more parties of the inmate communication session;
   a disconnection of the inmate communication session; or
   a superimposition of an audible or visual message into the inmate communication session to describe a reason for the disconnection.

27. The monitoring center of claim 1, wherein the inmate communication session is between an inmate within a prison and an outsider remote from the prison.

28. The monitoring station of claim 11, wherein the inmate communication session is between an inmate within a prison and an outsider remote from the prison.

29. The monitoring server of claim 20, wherein the inmate communication session is between an inmate within a prison and an outsider remote from the prison.

* * * * *